(12) United States Patent
Schwengler et al.

(10) Patent No.: US 11,805,465 B2
(45) Date of Patent: *Oct. 31, 2023

(54) SYSTEM AND METHOD FOR IMPLEMENTING COMBINED BROADBAND AND WIRELESS SELF-ORGANIZING NETWORK (SON)

(71) Applicant: CenturyLink Intellectual Property LLC, Broomfield, CO (US)

(72) Inventors: Thomas Schwengler, Lakewood, CO (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,171

(22) Filed: Oct. 21, 2022

(65) Prior Publication Data

US 2023/0058761 A1     Feb. 23, 2023

Related U.S. Application Data

(63) Continuation of application No. 17/380,850, filed on Jul. 20, 2021, now Pat. No. 11,601,863, which is a
(Continued)

(51) Int. Cl.
*H04W 40/04*     (2009.01)
*H04W 84/18*     (2009.01)
(Continued)

(52) U.S. Cl.
CPC ............ *H04W 40/04* (2013.01); *H04L 41/12* (2013.01); *H04L 45/22* (2013.01); *H04W 84/18* (2013.01);
(Continued)

(58) Field of Classification Search
None
See application file for complete search history.

(56) References Cited

U.S. PATENT DOCUMENTS

| 5,717,955 A | 2/1998 | Swinehart |
| 6,792,319 B1 | 9/2004 | Bilger |
| (Continued) | | |

FOREIGN PATENT DOCUMENTS

| CN | 101799987 B | 11/2011 |
| EP | 2219322 | 9/2012 |
| (Continued) | | |

OTHER PUBLICATIONS

International Preliminary Report on Patentability, dated Jul. 17, 2018, Int'l Appl. No. PCT/US16/067938, Int'l Filing Date Dec. 21, 2016, 8 pgs.
(Continued)

*Primary Examiner* — Jay P Patel

(57) ABSTRACT

Novel tools and techniques might provide for implementing combined broadband and wireless self-organizing network ("SON") for provisioning of services. In some embodiments, a computing system might receive, from one or more first sensors and one or more second sensors, first operational states of fixed broadband network nodes and second operational states of wireless network nodes, respectively. The computing system might analyze the received first and second operational states, might determine an optimal network pathway and/or an optimal network backhaul pathway, and might establish the optimal network pathway and/or the optimal network backhaul pathway, through a determined combination of fixed and wireless network nodes, thereby implementing the combined broadband and wireless self-organizing network ("SON") for provisioning of services.

19 Claims, 11 Drawing Sheets

Related U.S. Application Data continuation of application No. 16/803,245, filed on Feb. 27, 2020, now Pat. No. 11,076,337, which is a continuation of application No. 16/138,674, filed on Sep. 21, 2018, now Pat. No. 10,588,070, which is a continuation of application No. 15/853,452, filed on Dec. 22, 2017, now Pat. No. 10,123,250, which is a continuation of application No. 15/675,936, filed on Aug. 14, 2017, now Pat. No. 9,867,112.

(60) Provisional application No. 62/425,946, filed on Nov. 23, 2016.

(51) Int. Cl.
  *H04L 45/00* (2022.01)
  *H04L 41/12* (2022.01)
  *H04W 24/02* (2009.01)
  *H04L 45/28* (2022.01)

(52) U.S. Cl.
  CPC ............ *H04L 45/28* (2013.01); *H04W 24/02* (2013.01); *Y02D 30/70* (2020.08)

(56) References Cited

U.S. PATENT DOCUMENTS

| | | | |
|---|---|---|---|
| 7,030,781 B2 | 4/2006 | Jones | |
| 7,096,003 B2 | 8/2006 | Joao | |
| 7,397,363 B2 | 7/2008 | Joao | |
| 7,792,040 B2 | 9/2010 | Nair | |
| 8,000,314 B2 | 8/2011 | Brownrigg | |
| 8,296,383 B2 | 10/2012 | Lindahl | |
| 8,380,652 B1 | 2/2013 | Francis, Jr. | |
| 8,611,331 B2* | 12/2013 | Ji | H04W 24/02 370/347 |
| 8,654,936 B1 | 2/2014 | Eslambolchi et al. | |
| 8,787,246 B2 | 7/2014 | Brownrigg | |
| 8,811,887 B2 | 8/2014 | Dottling et al. | |
| 8,976,704 B2 | 3/2015 | Morper | |
| 9,042,264 B2* | 5/2015 | Catovic | H04W 24/02 370/254 |
| 9,210,583 B2 | 12/2015 | Henderson | |
| 9,298,410 B2 | 3/2016 | Juchem | |
| 9,326,297 B1 | 4/2016 | Farkas | |
| 9,363,690 B1 | 6/2016 | Singh et al. | |
| 9,390,608 B2 | 7/2016 | Lundy | |
| 9,432,340 B1 | 8/2016 | Tutt et al. | |
| 9,456,276 B1 | 9/2016 | Chhetri | |
| 9,832,655 B2 | 11/2017 | Horneman | |
| 9,843,624 B1 | 12/2017 | Taaghol | |
| 9,860,677 B1 | 1/2018 | Agerstam | |
| 9,860,812 B2 | 1/2018 | Tipton | |
| 9,867,057 B2 | 1/2018 | Yu | |
| 9,867,112 B1 | 1/2018 | Schwengler | |
| 9,917,903 B2 | 3/2018 | Clernon | |
| 9,935,833 B2 | 4/2018 | McAllister | |
| 10,305,959 B2 | 5/2019 | Tofighbakhsh | |
| 10,326,532 B2* | 6/2019 | Ashrafi | H04B 10/616 |
| 2001/0029311 A1 | 10/2001 | Khare | |
| 2002/0024450 A1 | 2/2002 | Townsend | |
| 2003/0061029 A1 | 3/2003 | Shaket | |
| 2004/0083054 A1 | 4/2004 | Jones | |
| 2004/0113773 A1 | 6/2004 | Nieters | |
| 2004/0160319 A1 | 8/2004 | Joao | |
| 2005/0248444 A1 | 11/2005 | Joao | |
| 2007/0079113 A1 | 4/2007 | Kulkarni et al. | |
| 2007/0087756 A1 | 4/2007 | Hoffberg | |
| 2008/0045234 A1 | 2/2008 | Reed | |
| 2008/0234878 A1 | 9/2008 | Joao | |
| 2008/0256008 A1 | 10/2008 | Kwok | |
| 2008/0303654 A1 | 12/2008 | Kates | |
| 2009/0121860 A1 | 5/2009 | Kimmel | |
| 2009/0327910 A1 | 12/2009 | Black | |
| 2010/0027426 A1 | 2/2010 | Nair | |
| 2010/0124332 A1 | 5/2010 | Arena | |
| 2010/0217604 A1 | 8/2010 | Baldwin et al. | |
| 2010/0220597 A1* | 9/2010 | Ji | H04W 16/10 370/336 |
| 2010/0232318 A1* | 9/2010 | Sarkar | H04W 24/02 370/254 |
| 2010/0246440 A1* | 9/2010 | Catovic | H04W 24/02 370/254 |
| 2010/0325421 A1 | 12/2010 | Park et al. | |
| 2011/0106321 A1 | 5/2011 | Cherian | |
| 2011/0288684 A1 | 11/2011 | Farlow | |
| 2012/0020307 A1 | 1/2012 | Henderson | |
| 2012/0086563 A1 | 4/2012 | Arling | |
| 2012/0265370 A1 | 10/2012 | Kim | |
| 2012/0320766 A1 | 12/2012 | Sridhar | |
| 2013/0217421 A1 | 8/2013 | Kim | |
| 2013/0238326 A1 | 9/2013 | Kim et al. | |
| 2013/0294288 A1* | 11/2013 | Choi | H04L 47/762 370/254 |
| 2014/0018969 A1 | 1/2014 | Forbes | |
| 2014/0146905 A1 | 5/2014 | Zavadsky | |
| 2014/0162629 A1 | 6/2014 | Tipton | |
| 2014/0167931 A1 | 6/2014 | Lee et al. | |
| 2014/0172132 A1 | 6/2014 | Ura | |
| 2014/0180478 A1 | 6/2014 | Letsky | |
| 2014/0188463 A1 | 7/2014 | Noh et al. | |
| 2014/0233412 A1 | 8/2014 | Mishra | |
| 2014/0286165 A1* | 9/2014 | Chowdhury | H04W 4/029 370/235 |
| 2014/0343950 A1 | 11/2014 | Simpson et al. | |
| 2014/0369336 A1 | 12/2014 | Prakash | |
| 2015/0092744 A1 | 4/2015 | Singh | |
| 2015/0098385 A1 | 4/2015 | Navalekar | |
| 2015/0111589 A1 | 4/2015 | Yavuz | |
| 2015/0120502 A1 | 4/2015 | Jung et al. | |
| 2015/0124622 A1 | 5/2015 | Kovvali | |
| 2015/0249672 A1 | 9/2015 | Burns et al. | |
| 2015/0262102 A1 | 9/2015 | Tann | |
| 2015/0298654 A1 | 10/2015 | Joao | |
| 2015/0350247 A1 | 12/2015 | Adler et al. | |
| 2015/0365278 A1 | 12/2015 | Chakrabarti et al. | |
| 2016/0006837 A1 | 1/2016 | Reynolds | |
| 2016/0021127 A1 | 1/2016 | Yan | |
| 2016/0029346 A1 | 1/2016 | Suresh et al. | |
| 2016/0187995 A1 | 6/2016 | Rosewall | |
| 2016/0195876 A1 | 7/2016 | Mattsson | |
| 2016/0212613 A1 | 7/2016 | Huang | |
| 2016/0226674 A1 | 8/2016 | Kangshang et al. | |
| 2016/0248746 A1 | 8/2016 | James | |
| 2016/0278599 A1 | 9/2016 | Seo | |
| 2016/0294828 A1 | 10/2016 | Zakaria | |
| 2016/0295364 A1 | 10/2016 | Zakaria | |
| 2016/0329040 A1 | 11/2016 | Whinnery | |
| 2016/0330042 A1 | 11/2016 | Andersen | |
| 2016/0352526 A1 | 12/2016 | Adler et al. | |
| 2016/0359965 A1 | 12/2016 | Murphy et al. | |
| 2017/0006141 A1 | 1/2017 | Bhadra | |
| 2017/0006643 A1 | 1/2017 | Zakaria et al. | |
| 2017/0026157 A1 | 1/2017 | Bugenhagen et al. | |
| 2017/0026472 A1 | 1/2017 | Bugenhagen et al. | |
| 2017/0060369 A1 | 3/2017 | Goyal | |
| 2017/0085437 A1 | 3/2017 | Condeixa et al. | |
| 2017/0093866 A1 | 3/2017 | Ben-Noon | |
| 2017/0110784 A1 | 4/2017 | Vermes et al. | |
| 2017/0118687 A1 | 4/2017 | Tipton | |
| 2017/0134937 A1 | 5/2017 | Miller | |
| 2017/0141575 A1 | 5/2017 | Fulton | |
| 2017/0150299 A1 | 5/2017 | Coutinho et al. | |
| 2017/0163296 A1 | 6/2017 | Terry | |
| 2017/0171747 A1 | 6/2017 | Britt et al. | |
| 2017/0181383 A1 | 6/2017 | Shen | |
| 2017/0187807 A1 | 6/2017 | Clernon | |
| 2017/0192437 A1 | 7/2017 | Bier | |
| 2017/0195318 A1 | 7/2017 | Liu | |
| 2017/0195891 A1 | 7/2017 | Smith et al. | |
| 2017/0201504 A1 | 7/2017 | Funk | |
| 2017/0206900 A1 | 7/2017 | Lee et al. | |
| 2017/0253258 A1 | 9/2017 | Bramucci | |
| 2017/0279620 A1 | 9/2017 | Kravitz et al. | |

(56) References Cited

U.S. PATENT DOCUMENTS

| | | |
|---|---|---|
| 2017/0300953 A1 | 10/2017 | Kim |
| 2017/0331670 A1 | 11/2017 | Parkvall |
| 2017/0345420 A1 | 11/2017 | Barnett, Jr. |
| 2017/0358025 A1 | 12/2017 | Varma |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0122506 A1 | 5/2018 | Grantcharov |
| 2018/0146412 A1 | 5/2018 | Schwengler |
| 2018/0168464 A1 | 6/2018 | Barnett, Jr. et al. |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0351652 A1* | 12/2018 | Ashrafi ............ H04B 10/616 |
| 2019/0028951 A1 | 1/2019 | Schwengler et al. |
| 2019/0230675 A1 | 7/2019 | Papa |
| 2020/0177311 A1 | 6/2020 | Ho |
| 2020/0196217 A1 | 6/2020 | Schwengler |
| 2020/0348662 A1 | 11/2020 | Cella |
| 2021/0352561 A1 | 11/2021 | Schwengler |
| 2022/0303894 A1 | 9/2022 | Hoglund |

FOREIGN PATENT DOCUMENTS

| | | |
|---|---|---|
| KR | 10-2015-0128346 | 11/2015 |
| WO | WO-2009098676 | 8/2009 |
| WO | WO-2013058648 | 4/2013 |
| WO | WO-2017123392 | 7/2017 |

OTHER PUBLICATIONS

International Search Report and Written Opinion prepared by the Korean Intellectual Property Office as International Searching Authority for PCT Intl Patent App. No. PCT/US2016/067938 dated Mar. 31, 2017; 11 pages.

International Search Report and Written Opinion prepared by the Korean Intellectual Property Office as Internationalo Searching Authority for PCT International Patent Application No. PCT/US2017/034531 dated Aug. 29, 2017; 18 p.

Alexander, Chris et al., "Improved User Authentication in Off-The-Record Messaging", 2009, 7 pgs.

Bersch, Christian et al., "Bimanual Robotic Cloth Manipulation for Laundry Folding", 2011, 7 pgs.

Borisov, Nikita et al., "Off-the-Record Communication, or, Why Not To Use PGP", 2004, 8 pgs.

De Raimondo, Mario et al., "Secure Off-the-Record Messaging", 2005, 9 pgs.

Goldberg, Ian et al., "Multi-party Off-the-Record Messaging", 2007, 11 pgs.

Mills, Kevin L., "A brief survey of self-organization in wireless sensor networks", *Wirel. Commun. Mob. Comput.* vol. 7 2007 pp. 1-12.

* cited by examiner

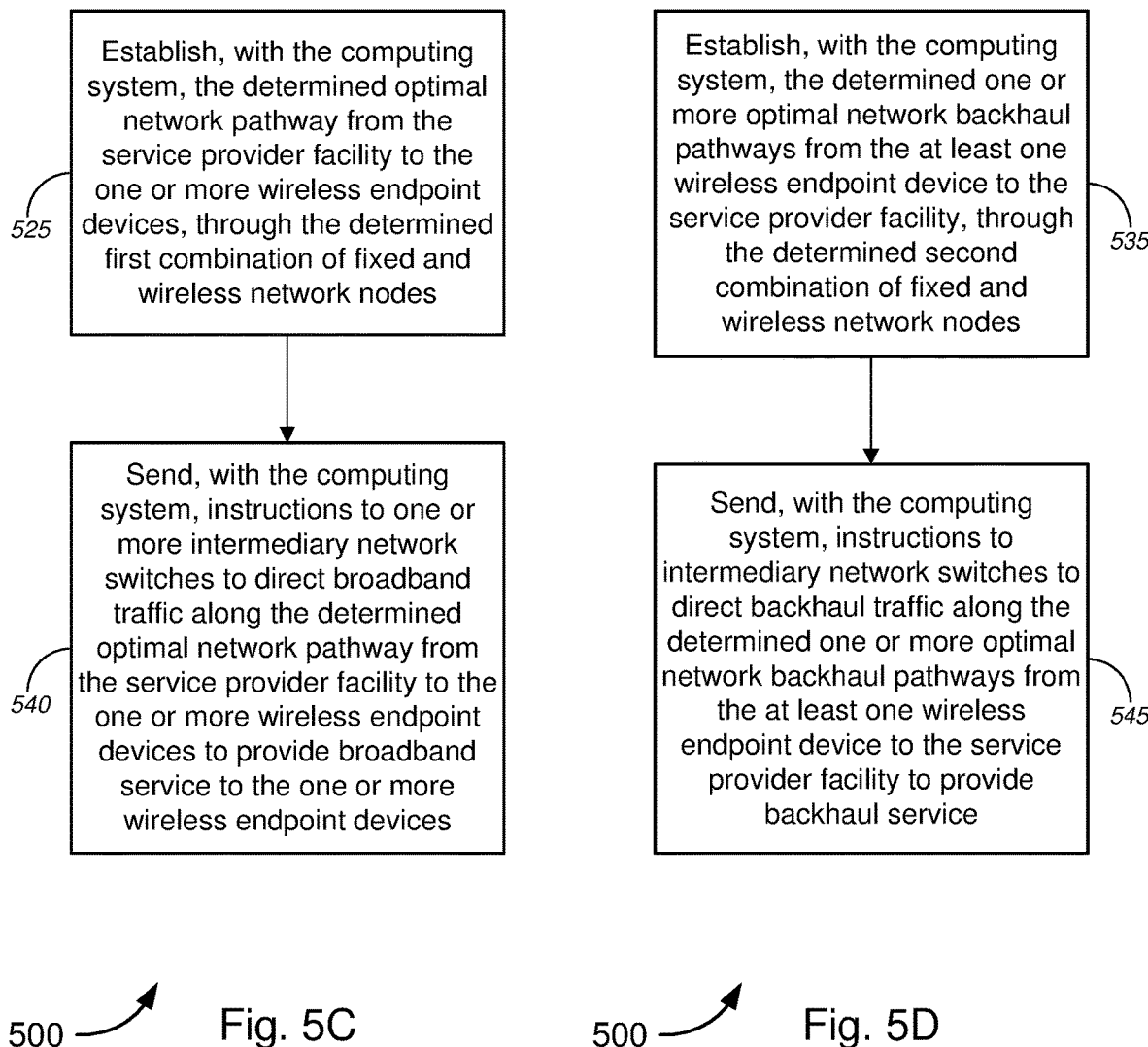

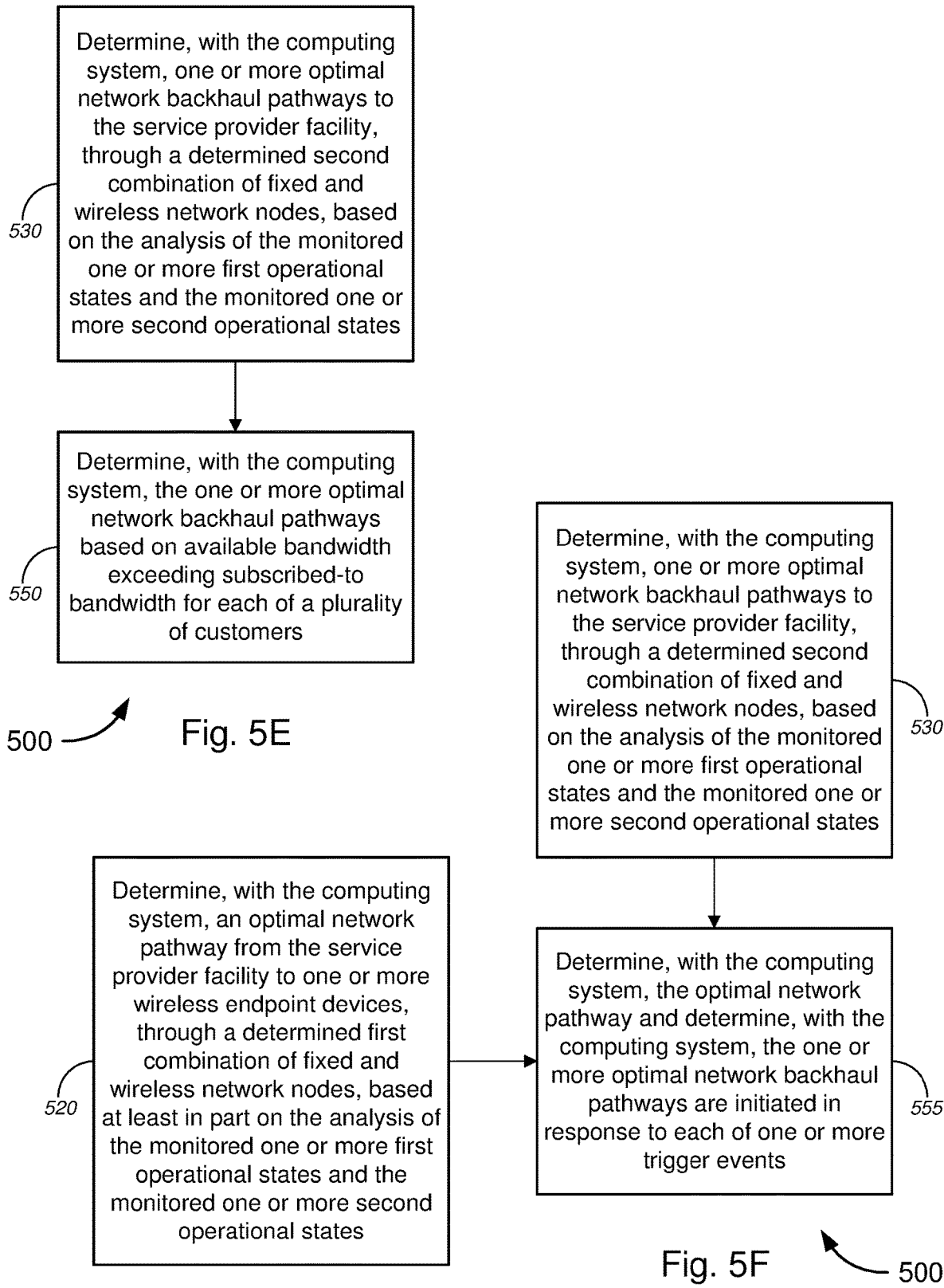

SYSTEM AND METHOD FOR IMPLEMENTING COMBINED BROADBAND AND WIRELESS SELF-ORGANIZING NETWORK (SON)

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing network infrastructure for provisioning of services, and, in particular embodiments, to methods, systems, apparatus, and computer software for implementing combined broadband and wireless self-organizing network ("SON") for provisioning of services.

BACKGROUND

In conventional networks, self-organizing network ("SON") features might exist in major mobile networks, such as LTE networks or the like. However, no SON optimization exists that combines a fixed broadband network (e.g., a wide area broadband network, or the like) with wireless extensions (such as in-home modems, small cells, or community WiFi, or the like).

Hence, there is a need for more robust and scalable solutions for implementing network infrastructure for provisioning of services, and, in particular embodiments, to methods, systems, apparatus, and computer software for implementing combined broadband and wireless self-organizing network ("SON") for provisioning of services.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5F are flow diagrams illustrating a method for implementing combined broadband and wireless SON, in accordance with various embodiments.

DETAILED DESCRIPTION OF CERTAIN EMBODIMENTS

Overview

Figure 1:
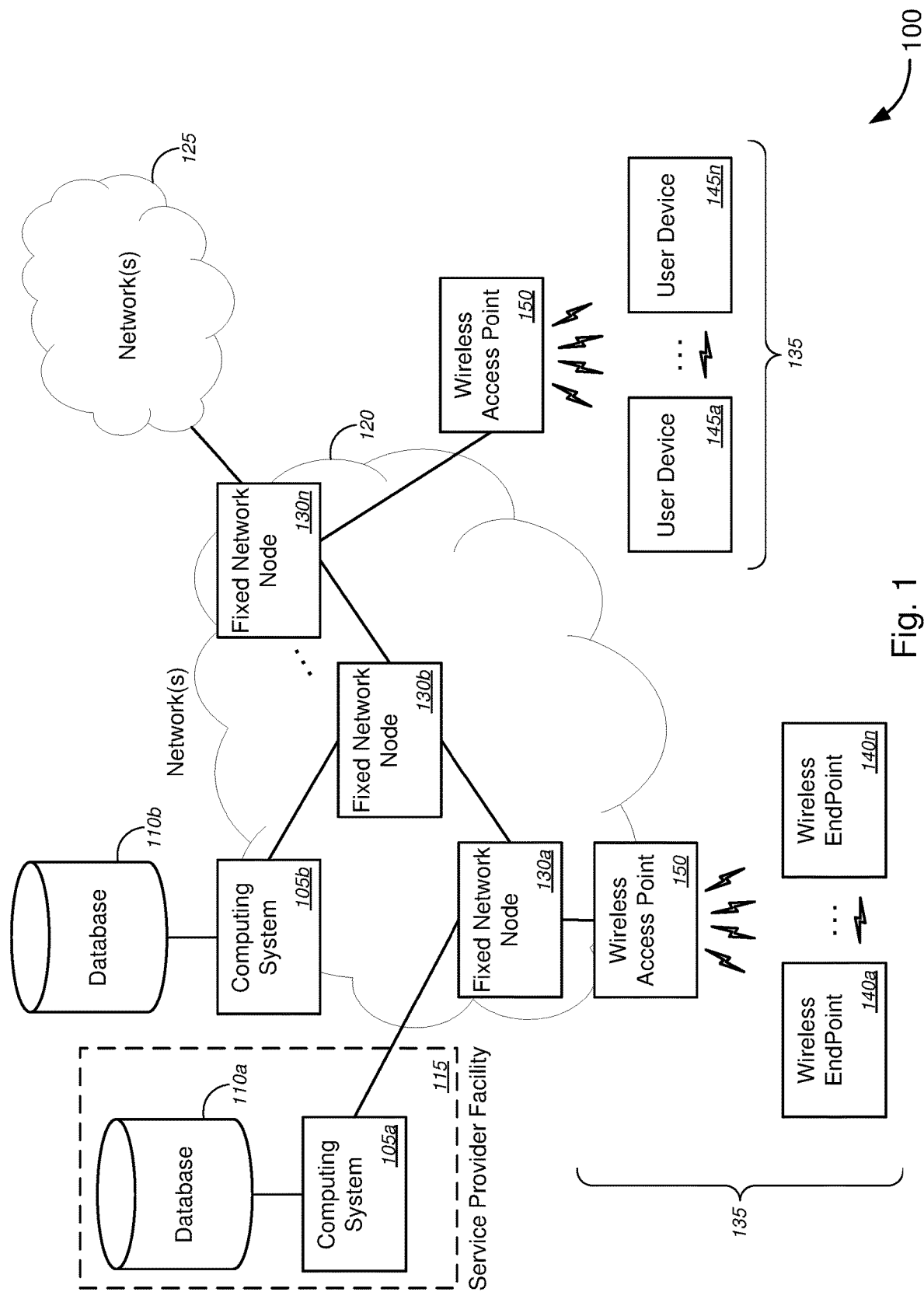
FIG. 1 is a schematic diagram illustrating a system for implementing combined fixed broadband and wireless self-organizing network ("SON"), in accordance with various embodiments.

Various embodiments provide tools and techniques for implementing network infrastructure for provisioning of services, and, in particular embodiments, to methods, systems, apparatus, and computer software for implementing combined broadband and wireless self-organizing network ("SON") for provisioning of services.

In various embodiments, a computing system might receive, from one or more first sensors, information regarding one or more first operational states of each of a plurality of fixed broadband network nodes of the one or more fixed network nodes between a service provider facility and a plurality of network interface devices located at a plurality of service areas (e.g., customer premises (e.g., single family homes, multi-dwelling complexes, hotels, resorts, etc.), business premises (e.g., office buildings, warehouses, factories, stores, etc.), government buildings, public buildings, public parks, etc.). In some cases, the network interface devices each might be either a gateway device (which might be either one of the fixed network nodes or one of the wireless network nodes (e.g., a wireless access point ("WAP"), or the like)). The computing system might similarly receive, from one or more second sensors, information regarding one or more second operational states of each of a plurality of wireless network nodes of the one or more wireless network nodes. A plurality of wireless endpoint devices (or user devices) of the plurality of wireless network nodes might be located at the plurality of service areas.

In some cases, monitoring the one or more first operational states might comprise obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. In some embodiments, monitoring the one or more second operational states comprises obtaining information comprising at least one of power levels, channel width, channel number, frequency of use of each channel, antenna elements, modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

The computing system might analyze the received information regarding the one or more first operational states of each of the plurality of fixed broadband network nodes and the received information regarding the one or more second operational states of each of the plurality of wireless network nodes. The computing system might subsequently determine an optimal network pathway from the service provider facility to one or more wireless endpoint devices (and/or to one or more user devices), through a determined first combination of fixed and wireless network nodes, based at least in part on the analysis of the received information regarding the one or more first operational states and the received information regarding the one or more second operational states. The determined first combination of fixed and wireless network nodes might comprise one or more fixed broadband network nodes of the plurality of fixed broadband network nodes and one or more wireless network nodes of the plurality of wireless network nodes. Merely by way of example, in some cases, determining the optimal network pathway might comprise determining, with the computing system, the optimal network pathway to optimize at least one of coverage, capacity, latency, load balancing, privilege of a given area, mobility robustness, or key performance characteristics of the combination of fixed and wireless network nodes, and/or the like.

The computing system might then establish the determined optimal network pathway from the service provider facility to the one or more wireless endpoint devices (and/or to the one or more user devices), through the determined first combination of fixed and wireless network nodes. In some embodiments, establishing the determined optimal network pathway from the service provider facility to the one or more wireless endpoint devices (and/or to the one or more user devices), through the determined first combination of fixed and wireless network nodes, might comprise sending, with the computing system, instructions to one or more intermediary network switches (whether fixed network nodes or wireless network nodes) to direct broadband traffic along the determined optimal network pathway from the service provider facility to the one or more wireless endpoint devices (and/or to the one or more user devices) to provide broadband service to the one or more wireless endpoint devices.

In some embodiments, the computing system might similar determine and establish optimal network backhaul pathways to the service provider facility, through a determined combination of fixed and wireless network nodes. According to some embodiments, feedback mechanisms may be implemented to further optimize the network pathways and network backhaul pathways, by monitoring the one or more first operational states and monitoring the one or more second operational states after the network pathways and the network backhaul pathways had been established, by analyzing the further monitored first operational states and second operational states, determining a second optimal network pathway(s) and a second optimal network backhaul pathway(s).

The various embodiments described herein enable SON optimization of combined fixed broadband network (e.g., a wide area broadband network, or the like) and wireless network (such as in-home modems, small cells, or community WiFi, or the like). These and other functionalities are described in detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network infrastructure technology, self-organizing network ("SON") technology, and/or the like. In other aspects, certain embodiments, can improve the functioning of network equipment or systems themselves (e.g., telecommunications equipment, network components, etc.), for example, analyzing, with a computing system, the monitored one or more first operational states of each of the plurality of fixed broadband network nodes (from one or more first sensors) and the monitored one or more second operational states of each of the plurality of wireless network nodes (from one or more second sensors); determining, with the computing system, an optimal network pathway from the service provider facility to one or more wireless endpoint devices and/or an optimal network backhaul pathway back to the service provider facility, through a determined first and/or second combination of fixed and wireless network nodes, based at least in part on the analysis of the monitored one or more first operational states and the monitored one or more second operational states; and establishing, with the computing system, the determined optimal network pathway from the service provider facility to the one or more wireless endpoint devices and/or the determined optimal network backhaul pathway back to the service provider facility, through the determined first and/or second combination of fixed and wireless network nodes. In particular, to the extent any abstract concepts are present in the various embodiments, those concepts can be implemented as described herein by devices, software, systems, and methods that involve specific novel functionality (e.g., steps or operations), such as analyzing, with a computing system, the monitored one or more first operational states of each of the plurality of fixed broadband network nodes (from one or more first sensors) and the monitored one or more second operational states of each of the plurality of wireless network nodes (from one or more second sensors); determining, with the computing system, an optimal network pathway from the service provider facility to one or more wireless endpoint devices and/or an optimal network backhaul pathway back to the service provider facility, through a determined first and/or second combination of fixed and wireless network nodes, based at least in part on the analysis of the monitored one or more first operational states and the monitored one or more second operational states; and establishing, with the computing system, the determined optimal network pathway from the service provider facility to the one or more wireless endpoint devices and/or the determined optimal network backhaul pathway back to the service provider facility, through the determined first and/or second combination of fixed and wireless network nodes, and/or the like, to name a few examples, that extend beyond mere conventional computer processing operations. These functionalities can produce tangible results outside of the implementing computer system, including, merely by way of example, implementing combined fixed (broadband) and wireless SON for provisioning of broadband and/or backhaul services, which may be observed or measured by customers and/or service providers at least in terms of improved network functionality.

In an aspect, a method might comprise monitoring, with one or more first sensors, one or more first operational states of each of a plurality of fixed broadband network nodes between a service provider facility and a plurality of network interface devices located at a plurality of service areas; and monitoring, with one or more second sensors, one or more second operational states of each of a plurality of wireless network nodes, the plurality of wireless network nodes comprising a plurality of wireless access points and a plurality of wireless endpoint devices, the plurality of wireless endpoint devices being located at the plurality of service areas. The method might also comprise analyzing, with a computing system, the monitored one or more first operational states of each of the plurality of fixed broadband network nodes and the monitored one or more second operational states of each of the plurality of wireless network nodes; and determining, with the computing system, an optimal network pathway from the service provider facility to one or more wireless endpoint devices, through a determined first combination of fixed and wireless network nodes, based at least in part on the analysis of the monitored one or more first operational states and the monitored one or more second operational states. The determined first combination of fixed and wireless network nodes might comprise one or more fixed broadband network nodes of the plurality of fixed broadband network nodes and one or more wireless network nodes of the plurality of wireless network nodes. The method might further comprise establishing, with the computing system, the determined optimal network pathway from the service provider facility to the one or more wireless endpoint devices, through the determined first combination of fixed and wireless network nodes.

In some embodiments, establishing the determined optimal network pathway from the service provider facility to the one or more wireless endpoint devices, through the determined first combination of fixed and wireless network nodes, might comprise sending, with the computing system, instructions to one or more intermediary network switches to direct broadband traffic along the determined optimal network pathway from the service provider facility to the one or more wireless endpoint devices to provide broadband service to the one or more wireless endpoint devices. In some cases, determining and establishing the optimal network pathway from the service provider facility to the one or more wireless endpoint devices, through the determined first combination of fixed and wireless network nodes are performed differently for different types of network services provided.

According to some embodiments, the method might further comprise determining, with the computing system, one or more optimal network backhaul pathways to the service provider facility, through a determined second combination of fixed and wireless network nodes, based on the analysis of the monitored one or more first operational states and the monitored one or more second operational states; and establishing, with the computing system, the determined one or more optimal network backhaul pathways from the at least one wireless endpoint device to the service provider facility, through the determined second combination of fixed and wireless network nodes. The determined second combination of fixed and wireless network nodes might comprise at least one fixed broadband network node of the plurality of fixed broadband network nodes and at least one wireless network node of the plurality of wireless network nodes.

In some cases, the monitored one or more first operational states and the monitored one or more second operational states each might comprise bandwidth usage and bandwidth capacity, and determining the one or more optimal network backhaul pathways might comprise determining, with the computing system, the one or more optimal network backhaul pathways based on available bandwidth exceeding subscribed-to bandwidth for each of a plurality of customers. In some instances, establishing the determined one or more optimal network backhaul pathways from the at least one wireless endpoint device to the service provider facility might comprise sending, with the computing system, instructions to intermediary network switches to direct backhaul traffic along the determined one or more optimal network backhaul pathways from the at least one wireless endpoint device to the service provider facility to provide backhaul service.

In some embodiments, determining the optimal network pathway and determining the one or more optimal network backhaul pathways are initiated in response to each of one or more trigger events. The one or more trigger events, in some instances, might each comprise one of a sudden statistically significant change in network performance characteristics, a change in network performance characteristics that exceed predetermined threshold levels, a seasonal change in wireless propagation characteristics, a weather-related change in wireless propagation characteristics, a network service fault at one or more fixed broadband network nodes of the plurality of fixed broadband network nodes, a network service fault at one or more wireless network nodes of the plurality of wireless network nodes, a completed sales transaction with a customer for provisioning of network services to the customer, or a change in network usage that exceeds specified levels, and/or the like.

Merely by way of example, according to some embodiments, the plurality of fixed broadband network nodes might be associated with fixed broadband services comprising at least one of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, a frequency division vectoring service, a microwave radio service, a millimeter-wave radio service, a free-space optical service, a data over cable service interface specification ("DOCSIS")-based cable service, or a fixed backhaul wireless service, and/or the like. In some embodiments, the plurality of wireless network nodes might be associated with wireless communications comprising at least one of machine-to-machine Internet of Things ("IoT") communications, Bluetooth communications, Z-wave communications, ZigBee communications, WiFi communications, cellular network communications, and/or the like.

In various embodiments, the method might further comprise repeating the processes of: monitoring the one or more first operational states of each of the plurality of fixed broadband network nodes; monitoring the one or more second operational states of each of the plurality of wireless network nodes; and analyzing the monitored one or more first operations states of each of the plurality of fixed broadband network nodes and the monitored one or more second operational states of each of the plurality of wireless network nodes. The method might also comprise determining, with the computing system, a second optimal network pathway from the service provider facility to one or more wireless endpoint devices, through a determined third combination of fixed and wireless network nodes, based on the repeated analysis of the monitored one or more first operational states and the monitored one or more second operational states; determining, with the computing system, whether the optimal network pathway and the second optimal network pathway are different; and, based on a determination that the optimal network pathway and the second optimal network pathway are different, establishing, with the computing system, the determined second optimal network pathway from the service provider facility to the one or more wireless endpoint devices, through the determined third combination of fixed and wireless network nodes.

In some embodiments, at least one fixed broadband network node of the plurality of fixed broadband network nodes might comprise at least one first sensor of the one or more first sensors. The at least one first sensor might monitor the one or more first operational states of each of one or more adjacent fixed broadband network nodes of the plurality of fixed broadband network nodes. In some instances, at least one wireless network node of the plurality of wireless network nodes might comprise at least one second sensor of the one or more second sensors. The at least one second sensor might monitor the one or more second operational states of each of one or more adjacent wireless network nodes of the plurality of wireless network nodes.

According to some embodiments, monitoring the one or more first operational states might comprise obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. In some embodiments, monitoring the one or more second operational states comprises obtaining information comprising at least one of power levels, channel width, channel number, frequency of use of each channel, antenna elements, modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

According to various embodiments, determining the optimal network pathway might comprise determining, with the computing system, the optimal network pathway to optimize at least one of coverage, capacity, latency, load balancing, privilege of a given area, mobility robustness, or key performance characteristics of the combination of fixed and wireless network nodes, and/or the like. In some cases, the computing system might comprise one of a server computer located at the service provider facility, a distributed computing system, at least one of the plurality of fixed broadband network nodes, or at least one of the plurality of wireless network nodes, and/or the like.

According to some embodiments, determining the optimal network pathway might comprise determining, with the computing system, one or more parameters to adjust in each of one or more of at least one fixed broadband network node of the plurality of fixed broadband network node or at least one wireless network node of the plurality of wireless network node to optimize at least one of coverage, capacity, latency, load balancing, privilege of a given area, mobility robustness, or key performance characteristics of the combination of fixed and wireless network nodes. Establishing the determined optimal network pathway might thus comprise adjusting, with the computing system, the determined one or more parameters in each of one or more of the at least one fixed broadband network node or the at least one wireless network node. Merely by way of example, in some cases, the one or more parameters might include, without limitation, at least one of bandwidth, train rate, tone being used, power levels, channel width, channel number, frequency of use, antenna element parameters, modulation coding scheme, signal preconditioning parameters, or cyclic prefix (i.e., regular or extended), and/or the like. The modulation coding scheme might include, but is not limited to, at least one of modulation level, forward error correction ("FEC") type, or multiple-input multiple-output ("MIMO") rank, and/or the like. In other words, determining and establishing the optimal network pathway might either involve re-routing the network path through the combination of fixed and wireless network nodes and/or adjusting one or more parameters of the (existing or re-routed) fixed and/or wireless network nodes, or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from one or more first sensors, information regarding one or more first operational states of each of a plurality of fixed broadband network nodes between a service provider facility and a plurality of network interface devices located at a plurality of service areas; receive, from one or more second sensors, information regarding one or more second operational states of each of a plurality of wireless network nodes, the plurality of wireless network nodes comprising a plurality of wireless access points and a plurality of wireless endpoint devices, the plurality of wireless endpoint devices being located at the plurality of service areas; analyze the received information regarding the one or more first operational states of each of the plurality of fixed broadband network nodes and the received information regarding the one or more second operational states of each of the plurality of wireless network nodes; determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states, the determined first combination of fixed and wireless network nodes comprising one or more fixed broadband network nodes of the plurality of fixed broadband network nodes and one or more wireless network nodes of the plurality of wireless network nodes; and establish the determined optimal network pathway from the service provider facility to the one or more wireless endpoint devices, through the determined first combination of fixed and wireless network nodes.

According to some embodiments, the apparatus might comprise one of a server computer located at the service provider facility, a distributed computing system, at least one of the plurality of fixed broadband network nodes, or at least one of the plurality of wireless network nodes, and/or the like.

In yet another aspect, a system might comprise one or more first sensors that monitor one or more first operational states of each of a plurality of fixed broadband network nodes between a service provider facility and a plurality of network interface devices located at a plurality of service areas; one or more second sensors that monitor one or more second operational states of each of a plurality of wireless network nodes, the plurality of wireless network nodes comprising a plurality of wireless access points and a plurality of wireless endpoint devices, the plurality of wireless endpoint devices being located at the plurality of service areas; and a computing system. The computing system might comprise at least one processor and a non-transitory computer readable medium communicatively coupled to the at least one processor. The non-transitory computer readable medium might have stored thereon computer software comprising a set of instructions that, when executed by the at least one processor, causes the computing system to: receive, from the one or more first sensors, information regarding one or more first operational states of each of the plurality of fixed broadband network nodes between the service provider facility and the plurality of network interface devices located at the plurality of service areas; receive, from the one or more second sensors, information regarding one or more second operational states of each of the plurality of wireless network nodes; analyze the received information regarding the one or more first operational states of each of the plurality of fixed broadband network nodes and the received information regarding the one or more second operational states of each of the plurality of wireless network nodes; determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states, the determined first combination of fixed and wireless network nodes comprising one or more fixed broadband network nodes of the plurality of fixed broadband network nodes and one or more wireless network nodes of the plurality of wireless network nodes; and establish the determined optimal network pathway from the service provider facility to the one or more wireless endpoint devices, through the determined first combination of fixed and wireless network nodes.

In some embodiments, at least one fixed broadband network node of the plurality of fixed broadband network nodes might comprise at least one first sensor of the one or more first sensors. The at least one first sensor might monitor the one or more first operational states of each of one or more adjacent fixed broadband network nodes of the plurality of fixed broadband network nodes. In some instances, at least one wireless network node of the plurality of wireless network nodes might comprise at least one second sensor of the one or more second sensors. The at least one second sensor might monitor the one or more second operational states of each of one or more adjacent wireless network nodes of the plurality of wireless network nodes.

According to some embodiments, the computing system might comprise one of a server computer located at the service provider facility, a distributed computing system, at least one of the plurality of fixed broadband network nodes, or at least one of the plurality of wireless network nodes, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing network infrastructure for provisioning of services, and, in particular embodiments, to methods, systems, apparatus, and computer software for implementing combined broadband and wireless self-organizing network ("SON") for provisioning of services, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing combined fixed broadband and wireless self-organizing network ("SON"), in accordance with various embodiments. In the non-limiting embodiment of FIG. 1, system 100 might comprise computing systems 105a and/or 105b (collectively, "computing systems 105") and corresponding databases 110*a* and/or 110*b* (collectively, "databases 110"). Computing system 105*a* and corresponding database 110*a* might be located at a service provider facility 115, which might include, without limitation, one of a central office ("CO") or other service provider locations. Computing system 105*b* and corresponding database 110*b* might be located at another location within service provider network(s) 120, which might communicatively couple with network(s) 125. Network(s) 120 and 125 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a cellular network, an LTE network, a network operating under any of the IEEE 802.11 suite of protocols, the 802.16 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. Network(s) 120 might also include an access network of the service provider (e.g., an Internet service provider ("ISP"), or the like), or a core network of the service provider, or the like.

According to some embodiments, system 100 might further comprise one or more fixed broadband network nodes or fixed network nodes 130*a*-130*n* (collectively, "fixed network nodes 130," "fixed broadband network nodes 130," or "network nodes 130," or the like) and one or more wireless network nodes 135. The one or more wireless network nodes 135 might include, without limitation, one or more wireless endpoint devices 140*a*-140*n* (collectively, "wireless endpoints 140," "endpoint devices 140," "wireless node 140," "wireless network node 140," or the like), one or more user devices 145*a*-145*n* (collectively, "user devices 145," "devices 145," "wireless node 145," "wireless network node 145," or the like), one or more wireless access point ("WAP") devices 150 (collectively, "wireless access points 150," "WAPs 150," "wireless node 150," "wireless network node 150," or the like), and/or the like.

Here, "fixed" (broadband) network nodes refer to wired or optical cable-based network nodes, or broadband wireless microwave or millimeter-wave or free-space optical links that are typically (although not always) fixed in place within particular geographical locations. Merely by way of example, in some embodiments, the fixed broadband network nodes 130 might be associated with fixed broadband services including, but not limited to, at least one of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, a frequency division vectoring service, a microwave radio service, a millimeter-wave radio service, a free-space optical service, a data over cable service interface specification ("DOCSIS")-based cable service, or a fixed backhaul wireless service, and/or the like. In some cases, the fixed backhaul wireless service might include, but is not limited to, point-to-point or point-to-multipoint microwave or millimeter-wave lines. These fixed backhaul wireless links, in some instances, might include their own subset of self-organizing rules to optimize backhaul services. According to some embodiments, wireless network nodes 135 might be associated with wireless communications comprising at least one of machine-to-machine Internet of Things ("IoT") communications, Bluetooth communications, Z-wave communications, ZigBee communications, WiFi communications, cellular network communications (e.g., 3G, 4G, 4G LTE, 5G, etc.), and/or the like. The WAPs 150 each provides a bridge between fixed broadband service and wireless broadband service, as depicted in FIG. 1 by solid line connections with one or more fixed network nodes 130 and by lightning bolt symbols denoting wireless communications with one or more wireless network nodes 135.

According to some embodiments, the computing system 105*a* or 105*b* (collectively, "computing system 105") might comprise one of a server computer located at the service provider facility 115, a distributed computing system, at least one of the one or more fixed broadband network nodes 130, or at least one of the one or more wireless network nodes 135, and/or the like. In some cases, at least one fixed broadband network node 130 of the one or more fixed network nodes 130 might comprise at least one first sensor. The at least one first sensor might monitor the one or more first operational states of each of at least one adjacent fixed broadband network node 130 of the one or more fixed broadband network nodes 130. In embodiments where fixed broadband network nodes are linked by fixed wireless links, such links may be affected by weather impediments such as rain fades or the like. A combination of the use of rain sensors and attenuation measurements might be used to monitor operational states, and the computing system 105 might, based on the monitoring of operational states, optionally change paths within the fixed broadband network nodes and/or the fixed wireless network nodes, or the like. In embodiments where the fixed broadband network nodes are linked by a mix of fixed wireless links and wired links, monitoring weather impediments and rain fades might result in prioritizing links towards wired links during weather-affected time periods. At least one wireless network node 135 of the one or more wireless network nodes 135, in some cases, might comprise at least one second sensor. The at least one second sensor might monitor the one or more second operational states of each of at least one adjacent wireless network node 135 of the one or more wireless network nodes 135.

In operation, computing system 105 might receive, from one or more first sensors, information regarding one or more first operational states of each of a plurality of fixed broadband network nodes 130 of the one or more fixed network nodes 130 between a service provider facility 115 and a plurality of network interface devices located at a plurality of service areas (e.g., customer premises (e.g., single family homes, multi-dwelling complexes, hotels, resorts, etc.), business premises (e.g., office buildings, warehouses, factories, stores, etc.), government buildings, public buildings, public parks, etc.). In some cases, the network interface devices each might be either a gateway device (which might be either one of the fixed network nodes 130 or one of the wireless network nodes 135 (e.g., a WAP 150 or the like)). The computing system 105 might similarly receive, from one or more second sensors, information regarding one or more second operational states of each of a plurality of wireless network nodes 135 of the one or more wireless network nodes 135. A plurality of wireless endpoint devices 140 or user devices 145 of the plurality of wireless network nodes 135 might be located at the plurality of service areas.

In some cases, monitoring the one or more first operational states might comprise obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. In some embodiments, monitoring the one or more second operational states comprises obtaining information comprising at least one of power levels, channel width, channel number, frequency of use of each channel, antenna elements, modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

The computing system 105 might analyze the received information regarding the one or more first operational states of each of the plurality of fixed broadband network nodes 130 and the received information regarding the one or more second operational states of each of the plurality of wireless network nodes 135. The computing system 105 might subsequently determine an optimal network pathway from the service provider facility to one or more wireless endpoint devices 140 and/or to one or more user devices 145, through a determined first combination of fixed and wireless network nodes 130 and 135, based at least in part on the analysis of the received information regarding the one or more first operational states and the received information regarding the one or more second operational states. The determined first combination of fixed and wireless network nodes might comprise one or more fixed broadband network nodes 130 of the plurality of fixed broadband network nodes 130 and one or more wireless network nodes 135 of the plurality of wireless network nodes 135. Merely by way of example, in some cases, determining the optimal network pathway might comprise determining, with the computing system, the optimal network pathway to optimize at least one of coverage, capacity, latency, load balancing, privilege of a given area, mobility robustness, or key performance characteristics of the combination of fixed and wireless network nodes, and/or the like.

The computing system 105 might then establish the determined optimal network pathway from the service provider facility to the one or more wireless endpoint devices 140 and/or to the one or more user devices 145, through the determined first combination of fixed and wireless network nodes 130 and 135. In some embodiments, establishing the determined optimal network pathway from the service provider facility 115 to the one or more wireless endpoint devices 140 and/or to the one or more user devices 145, through the determined first combination of fixed and wireless network nodes 130 and 135, might comprise sending, with the computing system 105, instructions to one or more intermediary network switches (whether fixed network nodes 130 or wireless network nodes 135) to direct broadband traffic along the determined optimal network pathway from the service provider facility 115 to the one or more wireless endpoint devices 140 and/or to the one or more user devices 145 to provide broadband service to the one or more wireless endpoint devices. In some embodiments, multiple network services may be offered over the network, in which case each set of services may use a different determination method and/or parameters to determine the optimal network pathway(s). In other words, determining and establishing the optimal network pathway from the service provider facility to the one or more wireless endpoint devices, through the determined first combination of fixed and wireless network nodes are performed differently for different types of network services provided. For instance, video delivery services may optimize network pathways to minimize bit error rate, while other services such as voice services may optimize network pathways to minimize latency, and best effort data services offered at the same time over the same network might optimize network pathways in terms of maximizing throughput or other key parameters, including, without limitation, redundancy considerations, traffic statistics, peak bitrates, guaranteed bitrates, average bitrates, and/or the like.

According to some embodiments, the computing system 105 might repeat (or continually perform) the processes of: monitoring the one or more first operational states of each of the one or more fixed broadband network nodes 130; monitoring the one or more second operational states of each of the one or more wireless network nodes 135; and analyzing the monitored one or more first operations states of each of the one or more fixed broadband network nodes 130 and the monitored one or more second operational states of each of the one or more wireless network nodes 135. The computing system 105 might determine a second optimal network pathway from the service provider facility 115 to the one or more wireless endpoint devices 140 and/or to the one or more user devices 145, through a determined second combination of fixed and wireless network nodes 130 and 135, based on the repeated analysis of the monitored one or more first operational states and the monitored one or more second operational states. The computing system 105 might determine whether the optimal network pathway and the second optimal network pathway are different, and, based on a determination that the optimal network pathway and the second optimal network pathway are different, might establish the determined second optimal network pathway from the service provider facility to the one or more wireless endpoint devices 140 and/or to the one or more user devices 145, through the determined second combination of fixed and wireless network nodes 130 and 135.

According to various embodiments, determining the optimal network pathway might comprise determining, with the computing system 105, one or more parameters to adjust in each of one or more of at least one fixed broadband network node 130 of the plurality of fixed broadband network node 130 or at least one wireless network node 135 of the plurality of wireless network node 135 to optimize at least one of coverage, capacity, latency, load balancing, privilege of a given area, mobility robustness, or key performance characteristics of the combination of fixed and wireless network nodes. Establishing the determined optimal network pathway might thus comprise adjusting, with the computing system 105, the determined one or more parameters in each of one or more of the at least one fixed broadband network node 130 or the at least one wireless network node 135. Merely by way of example, in some cases, the one or more parameters might include, without limitation, at least one of bandwidth, train rate, tone being used, power levels, channel width, channel number, frequency of use, antenna element parameters (e.g., for beam forming or the like), modulation coding scheme, signal preconditioning parameters, or cyclic prefix (i.e., regular or extended), and/or the like. The modulation coding scheme might include, but is not limited to, at least one of modulation level, forward error correction ("FEC") type, or multiple-input multiple-output ("MIMO") rank, and/or the like. In other words, determining and establishing the optimal network pathway might either involve re-routing the network path through the combination of fixed and wireless network nodes 130 and/or 135 and/or adjusting one or more parameters of the (existing or re-routed) fixed and/or wireless network nodes 130 and/or 135, or the like.

In some embodiments, the computing system 105 might determine one or more optimal network backhaul pathways to the service provider facility 115 (from one or more of the fixed and/or wireless network nodes 130 and/or 135), through a determined third combination of fixed and wireless network nodes 130 and/or 135, based on the analysis of the monitored one or more first operational states and the monitored one or more second operational states. The determined third combination of fixed and wireless network nodes 130 and 135 might comprise at least one fixed broadband network node 130 of the one or more fixed broadband network nodes 130 and at least one wireless network node 135 of the one or more wireless network nodes 135. Merely by way of example, according to some embodiments, the monitored one or more first operational states and the monitored one or more second operational states might each include, without limitation, bandwidth usage and bandwidth capacity, and/or the like, and determining the one or more optimal network backhaul pathways might comprise determining, with the computing system 105, the one or more optimal network backhaul pathways based on available bandwidth exceeding subscribed-to bandwidth for each of a plurality of customers, or the like.

The computing system 105 might subsequently establish the determined one or more optimal network backhaul pathways to the service provider facility 115, through the determined third combination of fixed and wireless network nodes 130 and/or 135. According to some embodiments, establishing the determined one or more optimal network backhaul pathways to the service provider facility 115 might comprise sending, with the computing system 105, instructions to intermediary network switches (whether fixed network nodes 130 or wireless network nodes 135) to direct backhaul traffic along the determined one or more optimal network backhaul pathways (from the at least one wireless endpoint device or other wireless network nodes) to the service provider facility 115 to provide backhaul service.

According to some embodiments, the computing system 105 might repeat (or continually perform) the processes of: monitoring the one or more first operational states of each of the one or more fixed broadband network nodes 130; monitoring the one or more second operational states of each of the one or more wireless network nodes 135; and analyzing the monitored one or more first operations states of each of the one or more fixed broadband network nodes 130 and the monitored one or more second operational states of each of the one or more wireless network nodes 135. The computing system 105 might determine a second optimal network backhaul pathway to the service provider facility 115, through a determined fourth combination of fixed and wireless network nodes 130 and 135, based on the repeated analysis of the monitored one or more first operational states and the monitored one or more second operational states. The computing system 105 might determine whether the optimal network backhaul pathway and the second optimal network backhaul pathway are different, and, based on a determination that the optimal network backhaul pathway and the second optimal network backhaul pathway are different, might establish the determined second optimal network backhaul pathway to the service provider facility 115, through the determined fourth combination of fixed and wireless network nodes 130 and 135.

According to various embodiments, determining the optimal network backhaul pathway might comprise determining, with the computing system 105, one or more parameters to adjust in each of one or more of at least one fixed broadband network node 130 of the plurality of fixed broadband network node 130 or at least one wireless network node 135 of the plurality of wireless network node 135 to optimize backhaul service. Establishing the determined optimal network backhaul pathway might thus comprise adjusting, with the computing system 105, the determined one or more parameters in each of one or more of the at least one fixed broadband network node 130 or the at least one wireless network node 135. Merely by way of example, in some cases, the one or more parameters might include, without limitation, at least one of bandwidth, train rate, tone being used, power levels, channel width, channel number, frequency of use, antenna element parameters (e.g., for beam forming or the like), modulation coding scheme, signal preconditioning parameters, or cyclic prefix (i.e., regular or extended), and/or the like. The modulation coding scheme might include, but is not limited to, at least one of modulation level, forward error correction ("FEC") type, or multiple-input multiple-output ("MIMO") rank, and/or the like. In other words, determining and establishing the optimal network backhaul pathway might either involve re-routing the network backhaul path through the combination of fixed and wireless network nodes 130 and/or 135 and/or adjusting one or more parameters of the (existing or re-routed) fixed and/or wireless network nodes 130 and/or 135, or the like.

In some embodiments, determining the optimal network pathway and determining the one or more optimal network backhaul pathways are initiated in response to each of one or more trigger events. Merely by way of example, according to some embodiments, the one or more trigger events might each include, without limitation, one of a sudden statistically significant change in network performance characteristics, a change in network performance characteristics that exceed predetermined threshold levels, a seasonal change in wireless propagation characteristics, a weather-related change in wireless propagation characteristics, a network service fault at one or more fixed broadband network nodes of the plurality of fixed broadband network nodes, a network service fault at one or more wireless network nodes of the plurality of wireless network nodes, a completed sales transaction with a customer for provisioning of network services to the customer, or a change in network usage that exceeds specified levels, and/or the like.

The various embodiments combine self-organizing network ("SON") concepts with fixed broadband infrastructure (like GPON, NGPON2, DSL, DOCSIS, or fixed broadband wireless links, or the like) and a form of wireless access (like Wi-Fi, LTE small cell, or upcoming 5G wireless systems, or the like), to provide a distributed wireless network (such as a community Wi-Fi or LTE network, or the like) with a distributed fixed network backhaul such as a business or residential GPON, DSL or other broadband network, or the like. SONs rely on automatic data collection, analytics, and optimization algorithms. The innovative part is to combine the fixed infrastructure parameters with the wireless parameters. For instance, in a major service provider broadband service area, one might combine GPON, ADSL2+, VDSL2, and Wi-Fi optimization, or the like. First, SON monitoring collects information on all lines and parameters such as GPON parameters, DSL line quality, training rates, as well as optimization parameters such as DSL vectoring rates, stability, and optimization, or the like. In parallel, SON monitoring examines all Wi-Fi (or other wireless protocol like LTE, or the like) key performance parameters (e.g., key performance indicators ("KPI"), etc.), such as throughput, error rates, preferred MCS, and all report parameters, or the like. The various embodiments combine the two large groups of data, based on additional value in combining the information, for example: every fixed line address being known, providing geolocation for wireless optimization, giving information on potential neighbors; and/or wireless access points being used to probe and refine neighbor information from above. Classic SON techniques may be applied that combine the two sets of information: derive knowledge of state of system, locations, parameters, coverage, capacity, and/or the like; define optimizing strategy, and allows user-defined strategies (such as optimize coverage, vs capacity, vs latency, load balancing, privilege a given area, etc.); execute specific parameter changes to achieve the overall strategy; and/or the like. The approach is well suited to support new unplanned deployment of access points or small cells including femtocells, based on broadband customer orders, rather than planned roll-outs (as a wireless carrier would do).

The combination of these SON features enables optimal network load balancing between radio resources and fixed broadband resources. Combining the algorithms and classic research topics with the combination of wireless parameters and a very distributed set of fixed broadband service offers new sets of optimization goals, including optimization tradeoffs between radio resource management and the many backhaul links. Learning algorithms are used to: derive knowledge of state of system-in the various embodiments combining both radio resource and broadband/backhaul links (e.g., locations, parameters, coverage, capacity, line states, etc.); define optimizing strategy—in the various embodiments defining operator priorities and strategies for radio resources (such as optimizing coverage, vs capacity, vs latency, load balancing, privilege a given area, etc.) and combining these strategies with fixed broadband network utilization and optimization (e.g., line rate, general noise mitigation NEXT/FEXT, load balancing, self-healing, etc.); execute specific parameter changes both on fixed lines and radio resources to achieve the overall strategy; and/or the like. Relevant optimization algorithms might include, without limitation, learning algorithms, game theory, and/or the like. In some embodiments, learning algorithms include, but are not limited to, complex optimization and line rate change algorithms; overall key performance parameter algorithms; system parameter setting algorithms (e.g., setting goals, priority, key parameters, and overall SON strategies, etc.); learning algorithms to improve these parameters over time; ongoing modification adjusting parameter algorithms to reach goals; and/or the like. According to some embodiments, game theory might include, without limitation, treating every wireless cells as an individual player; applying cooperative or conflicting game theorems to maximize gain (by setting key parameters), while minimizing some combined effects (such as interference); and/or the like.

Figure 2:
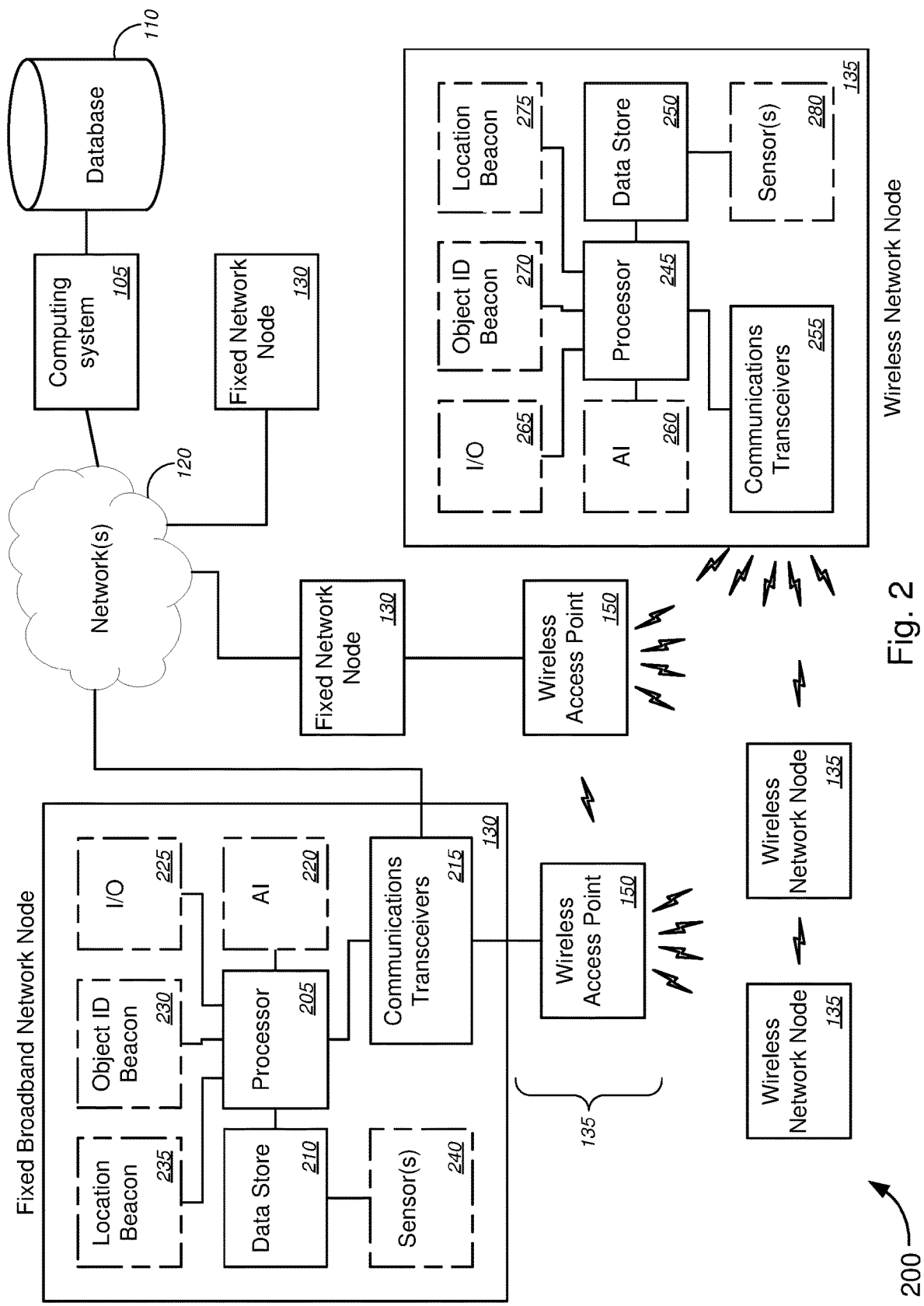
FIG. 2 is a block schematic diagram illustrating another system for implementing combined fixed broadband and wireless SON, in accordance with various embodiments.

FIG. 2 is a block schematic diagram illustrating another system 200 for implementing combined fixed broadband and wireless SON, in accordance with various embodiments. In the non-limiting embodiment of FIG. 2, system 200 might comprise a computing system 105 and corresponding database 110, a network(s) 120, one or more fixed broadband network nodes or fixed network nodes 130, and one or more wireless network nodes 135, which might include one or more wireless access point ("WAP") devices 150. Each fixed network node 130 might comprise a processor 205, a data store 210, one or more communications transceivers 215, an artificial intelligence ("AI") system 220 (optional), an input/output ("I/O") device 225 (optional), an object identification ("ID") beacon 230 (optional), a location beacon 235 (optional), and one or more sensors 240 (optional). Each wireless network node 135 might comprise a processor 245, a data store 250, one or more communications transceivers 255, an AI system 260 (optional), an I/O device 265 (optional), an object ID beacon 270 (optional), a location beacon 275 (optional), and one or more sensors 280 (optional).

The processors 205 or 245 execute a set(s) of instructions (which might be stored in corresponding data store(s) 210 or 250) that cause the network node 130 or 135 to perform functions consistent with network nodes for implementing combined fixed broadband and wireless SON as described herein. In addition to storing the set(s) of instructions, the data stores 210 or 250 might also store information regarding the operational states of adjacent or neighboring network nodes 130 or 135, or the like. The communications transceivers 215 or 255 enable the network nodes 130 or 135 to communicate with other network nodes 130 or 135 and/or with computing system 105 or other network hardware.

The AI systems 220 or 260, if present in a particular network node 130 or 135, might provide on-board AI processing to analyze the monitored operational states of neighboring or other network nodes 130, to determine optimal network pathways and/or optimal network backhaul pathways, and/or to establish the determined optimal network pathways and/or the determined optimal network backhaul pathways, in the case that the particular network node 130 or 135 serves as the computing system (or as one of many distributed computing systems), or the like. The AI systems 220 or 260 may also access external databases and information systems. The AI system may, for instance, use seasonal data or weather-related data in order to prefer one network path versus another. In some cases, the AI system 220 or 260 may access major road construction plans and may use them to minimize network traffic load on a network path following a road where scheduled construction is more likely to cause outages. the AI system 220 or 260 may also use rain statistics, rain forecast, and/or nearby rain sensors to predict rain fades in a microwave link and might lower that link's modulation, or might lower the link's use, or the like, before it is actually impacted by rain fade. The I/O devices 225 or 265, if present in a particular network node 130 or 135, might provide a user (e.g., service provider technician or the like) with I/O options in the case that physical interaction with the particular network node 130 or 135 is required or feasible (i.e., accessible or the like). The object ID beacons 230 or 270, if present in a particular network node 130 or 135, might provide requesting neighboring network nodes 130 or 135, the computing system 105, or other network hardware with the unique ID of the particular network node 130 or 135. The location beacon 235, if present in a particular network node 130 or 135, might provide requesting neighboring network nodes 130 or 135, the computing system 105, or other network hardware with location information of the particular network node 130 or 135.

The one or more sensors 240 or 280, if present in a particular network node 130 or 135, might provide the particular network node 130 or 135 with the capability to monitor adjacent or neighboring network nodes 130 or 135, or to enable other sensory functionalities (e.g., Internet of Things ("IoT") functionalities or the like). For fixed network nodes 130, the one or more sensors 240 (and in some embodiments, sensors 280 as well) might monitor neighboring network nodes 130 and obtain information about each neighboring network node 130. Such information might include, but is not limited to, at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. For wireless network nodes 135, the one or more sensors 280 (and in some embodiments, sensors 240 as well) might monitor neighboring network nodes 135 and obtain information about each neighboring network node 135. Such information might include, without limitation, at least one of power levels, channel width, channel number, frequency of use of each channel, antenna elements (e.g., for beam forming or the like), modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

The computing system 105, the database 110, the network(s) 120, the fixed network nodes 130, and the wireless network nodes 135 and 150 of system 200 in FIG. 2 are otherwise similar, if not identical, to the computing system 105a or 105b, the database 110a or 110b, the network(s) 120, the fixed (broadband) network nodes 130a-130n, and the wireless network nodes 135, 140a-140n, 145a-145n, and 150, respectively of system 100 of FIG. 1, and the descriptions of these components of system 100 are applicable to the corresponding components of system 200, respectively.

Figure 3:
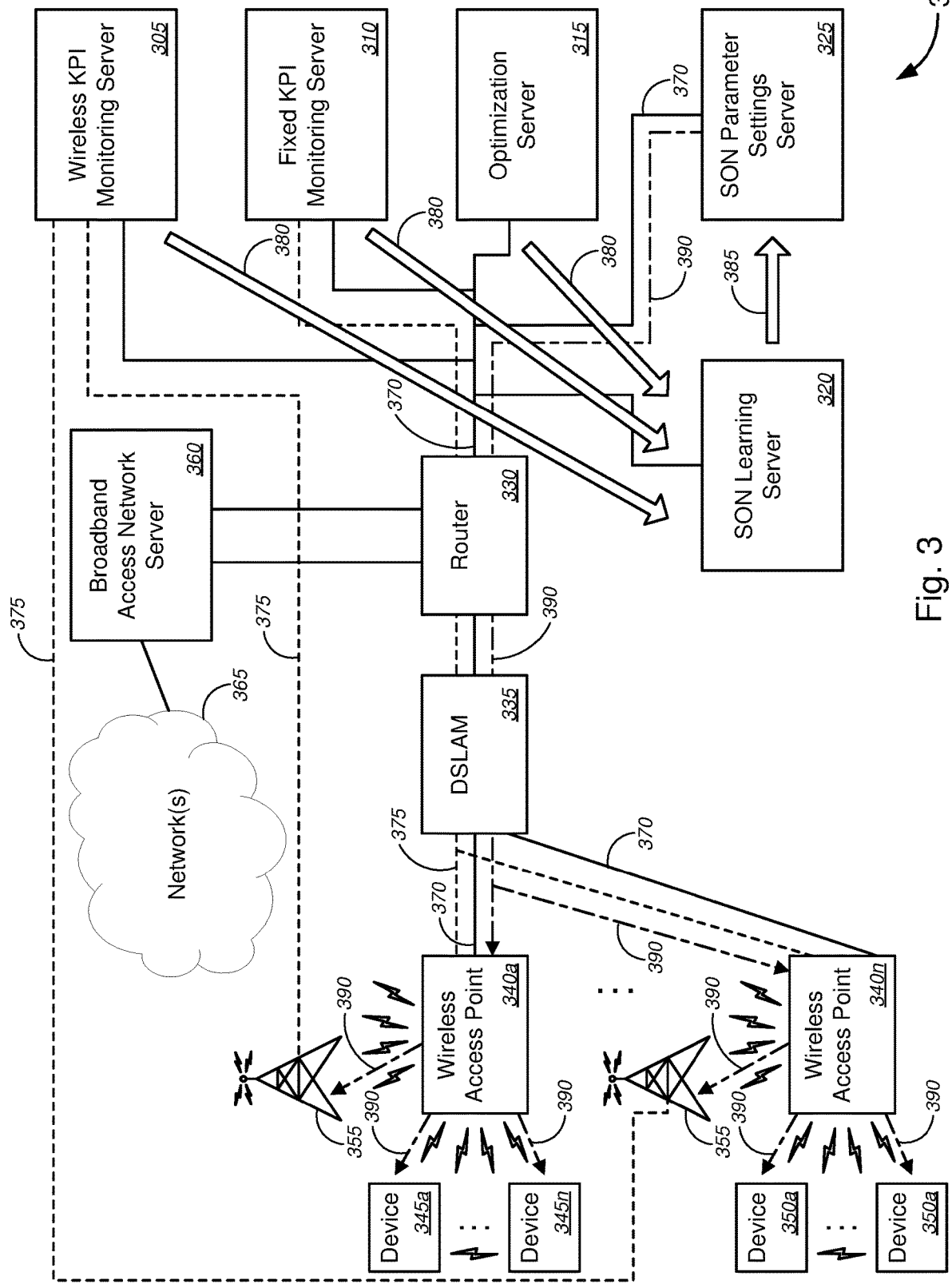
FIG. 3 is a block schematic diagram illustrating yet another system for implementing combined fixed broadband and wireless SON, in accordance with various embodiments.

FIG. 3 is a block schematic diagram illustrating yet another system 300 for implementing combined fixed broadband and wireless SON, in accordance with various embodiments. In the non-limiting embodiment of FIG. 3, system 300 might comprise a wireless key performance indicator ("KPI") monitoring server 305, a fixed KPI monitoring server 310, an optimization server 315, a self-organizing network ("SON") learning server 320, a SON parameter settings server 325, one or more routers 330, one or more digital subscriber line access multiplexers ("DSLAMs") 335, one or more wireless access points ("WAPs") 340a-340n, one or more devices 345a-345n or 350a-350n, one or more telecommunications relay systems 355, one or more broadband access network servers 360, and a network(s) 365.

With reference to FIG. 3, each of the wireless KPI monitoring server 305, the fixed KPI monitoring server 310, the optimization server 315, the SON learning server 320, and the SON parameter settings server 325 communicatively couples to the WAPs 340 and to the broadband access network server(s) 360 and network(s) 365 (as depicted in FIG. 3 by solid lines 370), via router(s) 330 and/or DSLAM(s) 335. The wireless KPI monitoring server 305 and the fixed KPI monitoring server 310 monitor and collect information regarding the operational states of wireless network nodes and of fixed network nodes, respectively, via corresponding wireless and fixed network connections (as depicted in FIG. 3 by dashed lines 375). The optimization server 315, likewise, monitors and collects optimization-related information, including, but not limited to, line qualification information, loop qualification information, ("DSL") vectoring rate information, other optimization information, and/or the like. The information collected by servers 305-315 are sent to SON learning server 320 (as depicted in FIG. 3 by arrows 380). The SON learning server 320 (which in some embodiments might correspond to computing systems 105a, 105b, 105, and 305 of FIGS. 1-3, or the like) might analyze the collected data, in some cases employing learning algorithms and strategies, to determine one or more optimal network pathways to optimize the combined broadband and wireless SON. The SON learning server 320 sends information associated with the determined one or more optimal network pathways to SON parameter settings server 325 (as depicted in FIG. 3 by the arrow 385). The SON parameter settings server 325 identifies the appropriate network nodes (both fixed and wireless), determines the parameters necessary to be modified in the identified network nodes in order to implement the determine one or more optimal network pathways, and sends the parameters to the identified network nodes (as depicted in FIG. 3 by the dash-long dash arrows 390), thereby establishing the optimal network pathways.

Figure 4A:
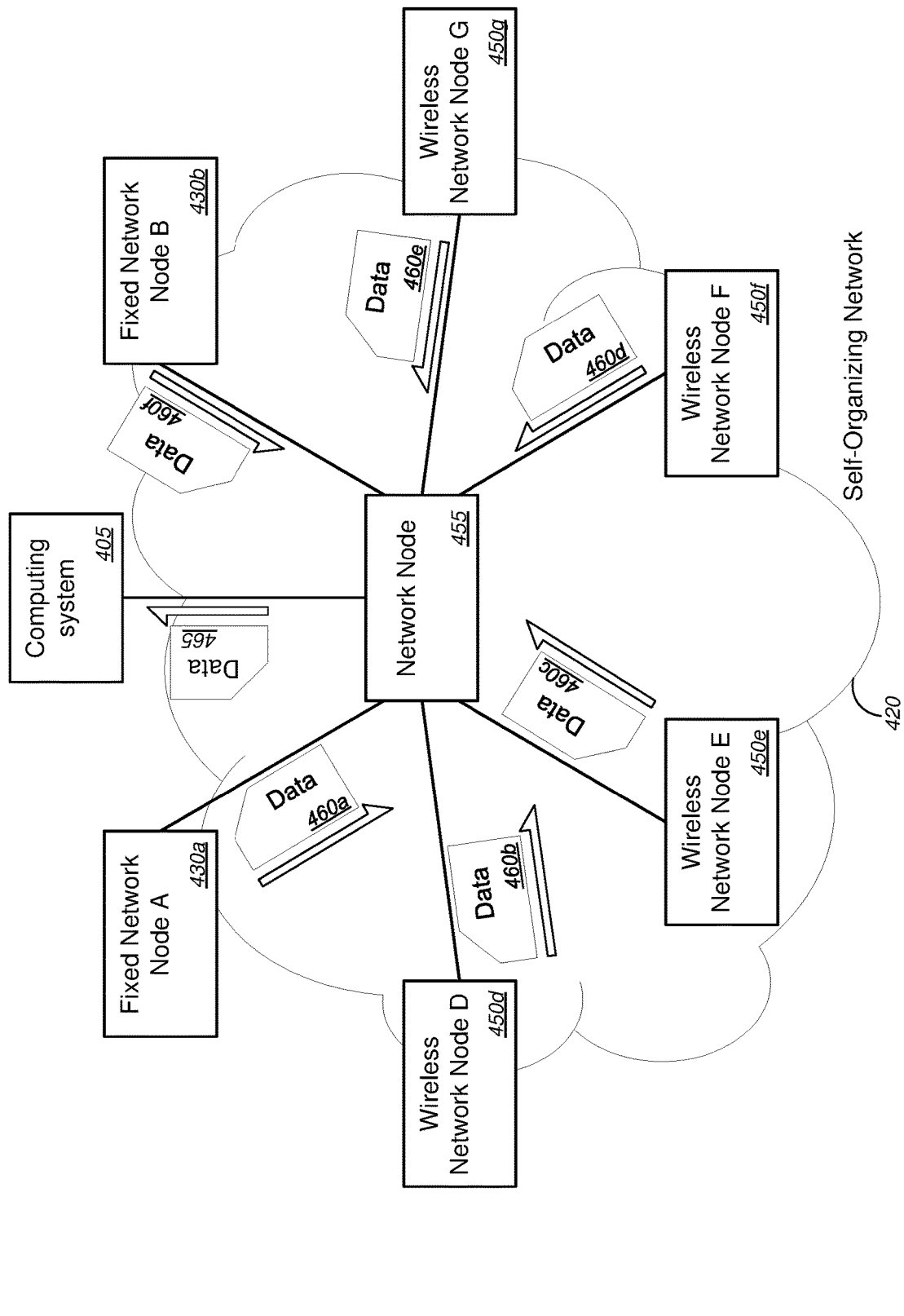
FIG. 4A is a schematic diagram illustrating an exemplary embodiment in which self-organizing network functionality is implemented to adjust to changes in individual fixed broadband network nodes and individual wireless network nodes in the self-organizing network.

FIG. 4A is a schematic diagram illustrating an exemplary embodiment 400 in which self-organizing network functionality is implemented to adjust to changes in individual fixed broadband network nodes and individual wireless network nodes in the self-organizing network. In the non-limiting embodiment of FIG. 4A, embodiment 400 might comprise computing system 405, one or more fixed (broadband) network nodes A and B 430a and 430b (collectively, "fixed network nodes 430"), one or more wireless network nodes D-G 450d-450g (collectively, "wireless network nodes 450"), and network node 455—which is one of a fixed network node 430 or a wireless network node 450. The fixed network nodes 430 and the wireless network nodes 450 combine to form a self-organizing network ("SON") 420. As part of a SON, the network node 455 monitors adjacent or neighboring network nodes (whether fixed network node 430 or wireless network node 450) for their operational states.

For example, monitoring the one or more first operational states of fixed network nodes might include, without limitation, obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. Monitoring the one or more second operational states of wireless network nodes might include, but is not limited to, obtaining information comprising at least one of power levels, channel width, channel number, frequency of use of each channel, antenna elements (e.g., for beam forming or the like), modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

With respect to the non-limiting embodiment of FIG. 4A, such SON monitoring would comprise a network node 455 (whether a fixed network node 430 or a wireless network node 450, or the like) receiving data 460*a* from fixed network node A 430*a*, data 460*f* from fixed network node B 430*b*, data 460*b* from wireless network node D 450*d*, data 460*c* from wireless network node E 450*e*, data 460*d* from wireless network node F 450*f*, and data 460*e* from wireless network node G 450*g*, and sending data 465 (directly or indirectly) to computing system 405. In other words, in some embodiments, data regarding the operational states of both neighboring fixed network nodes and neighboring wireless network nodes are monitored or collected by each network node (whether fixed network node or wireless network node), thus implementing the monitoring aspects of a combined fixed broadband and wireless self-organizing network ("SON").

Here, each of data 460*a* and data 460*f* contains information including, but not limited to, at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like, depending on the type of fixed network node. For instance, for each of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, or the like, information or data that might be of interest for (SON or other) optimization purposes might include, without limitation, link budget by location, number of splitters, available bandwidth, and/or the like. For each of a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, or the like, information or data that might be of interest for (SON or other) optimization purposes might include, but is not limited to, type of DSL (e.g., DSL, ADSL, ADSL2+, SDSL, RADSL, VDSL, VDSL2, VDSL2-Vplus, or the like), loop qualification information, loop length, port speed audit information (e.g., digital subscriber line access multiplexer ("DSLAM") port speed audit information, or the like), train rate information, DSL vectoring rate information, maximum available bit rates, current synchronization rates, tone utilization information, line code violation information, or upstream and downstream forward error correction ("FEC") information, and/or the like.

Here, train rate information refers to information regarding the upstream and downstream train rates. For example, each line (which might have a particular loop length) is provisioned at a certain rate. A modem or other computing system might send a training sequence to train the rate to be as close to optimal levels as possible. In other words, a line might be established at a certain (upload or download) speed, then the line might be tested at a higher speed until it achieves an optimal level (e.g., a level at which maximum acceptable error rates are reached, or the like). The tables below provide a non-limiting example of train rates and speed profile information that might be used for optimization of the combined fixed broadband and wireless SON.

TABLE 1

Example Downstream Train Rate Information

| Down Train Rate Summary | Count | % of Trained Ports |
|---|---|---|
| Trained at 100% of Provisioned Rate | 42 | 46.7% |
| Trained at ≥90% and <100% of Provisioned Rate | 47 | 52.2% |
| Trained at ≥70% and <90% of Provisioned Rate | 1 | 1.1% |
| Trained at <70% of Provisioned Rate | 0 | 0.0% |

TABLE 2

Example Upstream Train Rate Information

| Up Train Rate Summary | Count | % of Trained Ports |
|---|---|---|
| Trained at 100% of Provisioned Rate | 42 | 46.7% |
| Trained at ≥90% and <100% of Provisioned Rate | 48 | 53.3% |
| Trained at ≥70% and <90% of Provisioned Rate | 0 | 0.0% |
| Trained at <70% of Provisioned Rate | 0 | 0.0% |

TABLE 3

Example Speed Profile Information

| Speed Profile Summary (download × upload) | # Provisioned (at Rate) | In Service | Trained at 100% Down | Trained at 100% Up | Downstream Train Rate Mean (kbps) | Std Dev (kbps) | Upstream Train Rate Mean (kbps) | Std Dev |
|---|---|---|---|---|---|---|---|---|
| 15872 × 896 | 20 (22.2%) | 19 | 0 (0.0%) | 1 (5.3%) | 15828.6 (99.7%) | 174.8 | 891.3 (99.5%) | 1.8 |
| 50112 × 5120 | 10 (11.1%) | 10 | 9 (90.0%) | 10 (100.0%) | 49720.4 (99.2%) | 1174.8 | 5120 (100.0%) | 0 |
| 9216 × 896 | 7 (7.8%) | 7 | 1 (14.3%) | 1 (14.3%) | 9210.9 (99.9%) | 2.3 | 891.3 (99.5%) | 2.4 |
| 20128 × 896 | 7 (7.8%) | 7 | 1 (14.3%) | 1 (14.3%) | 20125.7 (100.0%) | 1.3 | 892.6 (99.6%) | 1.4 |
| 26112 × 896 | 7 (7.8%) | 7 | 7 (100.0%) | 6 (85.7%) | 26112 (100.0%) | 0 | 895.4 (99.9%) | 1.4 |

Herein also, "DSL vectoring" might refer to optimization for DSL service that, in some embodiments, seeks to lower excessive noise in DSL service to other customers due to too much power being supplied to service a particular customer's DSL service, by reducing the power to the particular customer's DSL service (thereby lowering the bandwidth). "DSL vectoring rate" might refer to the rate at which power is changed to enable such optimization. "Tone utilization" might refer to utilization of frequencies in the line, similar to spectrum being used on the line, where lower tone indices (or frequencies) are always used, while higher tone indices (or frequencies) are less used due to loop length limitations or the like that prevent consistent operation. "Line code violations information" might refer to particular error rates that are monitored constantly, whereby quick events may be identified and ignored, while major events are identified and addressed. These and other information may be used for optimization of the combined fixed broadband and wireless SON.

In alternative embodiments (not shown), fixed network nodes 430 might collect data 460 from only neighboring fixed network nodes 430 (and not from wireless network nodes 450), while wireless network nodes 450 might collect data 460 from only neighboring wireless network nodes 450 (and not from fixed network nodes 430). In such embodiments, the combined fixed broadband and wireless self-organizing network ("SON") is implemented by determine and establishing the optimal network pathways through a combination of fixed network nodes 430 and wireless network nodes 450, as shown and described below with respect to FIG. 4B, for instance.

Figure 4B:
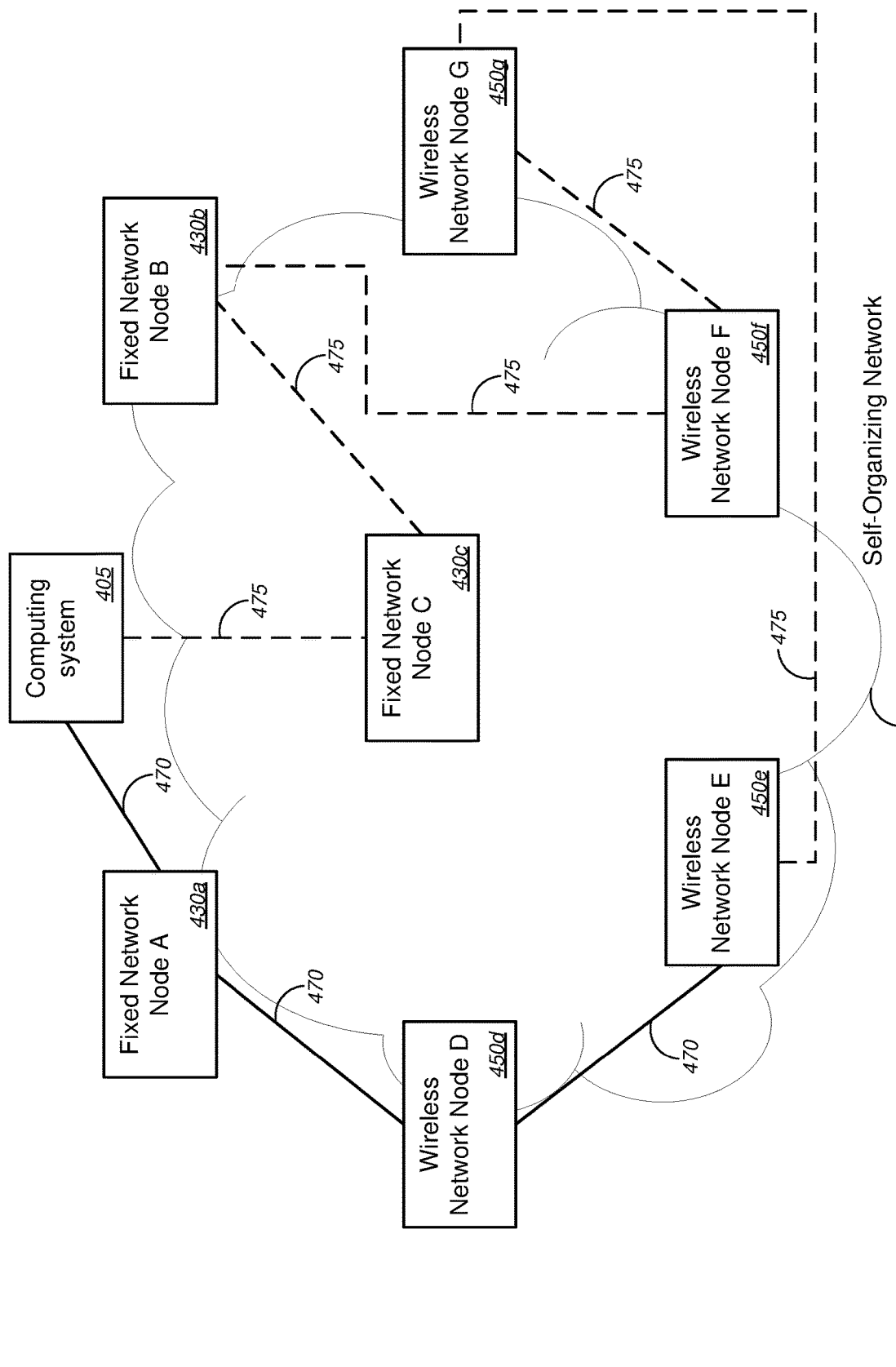
FIG. 4B is a schematic diagram illustrating an exemplary embodiment in which optimal paths are established through a combination of fixed broadband network nodes and wireless network nodes.

FIG. 4B is a schematic diagram illustrating an exemplary embodiment 400' in which optimal paths are established through a combination of fixed broadband network nodes and wireless network nodes. In the non-limiting embodiment of FIG. 4B, embodiment 400' might comprise computing system 405, one or more fixed (broadband) network nodes A-C 430*a*-430*c* (collectively, "fixed network nodes 430"), and one or more wireless network nodes D-G 450*d*-450*g* (collectively, "wireless network nodes 450"). The fixed network nodes 430 and the wireless network nodes 450 combine to form a self-organizing network ("SON") 420.

In some embodiments, a computing system 405 might receive, from one or more first sensors (which might correspond to sensor(s) 240 of FIG. 2, or the like), information regarding one or more first operational states of each of a plurality of fixed broadband network nodes 430 between a service provider facility and a plurality of network interface devices located at a plurality of service areas. The computing system 405 might receive, from one or more second sensors (which might correspond to sensor(s) 280 of FIG. 2, or the like), information regarding one or more second operational states of each of a plurality of wireless network nodes. The plurality of wireless network nodes might comprise a plurality of wireless access points (which might correspond to wireless access points 150 of FIGS. 1 and 2, or the like) and a plurality of wireless endpoint devices (which might correspond to wireless endpoint devices 140*a*-140*n* or user devices 145*a*-145*n*, or wireless network nodes 135 of FIG. 1 or wireless network nodes 135 of FIG. 2, or the like), the plurality of wireless endpoint devices being located at the plurality of service areas.

The computing system 405 might analyze the received information regarding the one or more first operational states of each of the plurality of fixed broadband network nodes and the received information regarding the one or more second operational states of each of the plurality of wireless network nodes. The computing system 405 might determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states. The determined first combination of fixed and wireless network nodes might comprise one or more fixed broadband network nodes of the plurality of fixed broadband network nodes and one or more wireless network nodes of the plurality of wireless network nodes. The computing system 405 might establish the determined optimal network pathway (which is depicted in FIG. 4B as a dashed line 475 compared with the prior network pathway depicted by a solid line 470) from the service provider facility to the one or more wireless endpoint devices, through the determined first combination of fixed and wireless network nodes.

With specific reference to FIG. 4B, a prior network path 470 (depicted as a solid line in FIG. 4B) might be established between computing system 405 and wireless network node E 450*e*, via fixed network node A 430*a* and wireless network node D 450*d*. The network path 470 may be unidirectional from computing system 405 to wireless network node E 450*e*, unidirectional from wireless network node E 450*e* to computing system 405, or bidirectional between computing system 405 and wireless network node E 450*e*. Based on analysis of the one or more monitored first operational states of each of the plurality of fixed broadband network nodes and the one or more monitored second operational states of each of the plurality of wireless network nodes, the computing system 405 might determine an optimal network pathway and might establish the optimal network pathway (depicted as a dashed line in FIG. 4B) between the computing system 405 and the wireless network node E 450*e*. Like network path 470, the network path 475 may be unidirectional from computing system 405 to wireless network node E 450*e*, unidirectional from wireless network node E 450*e* to computing system 405, or bidirectional between computing system 405 and wireless network node E 450*e*.

The process of determining and establishing the optimal network path 470 is described in detail below with respect to FIGS. 5A-5F.

The computing system 405, the fixed network node A-C 430*a*-430*c*, and the wireless network node D-G 450*d*-450*g* of system 400 or 400' in FIGS. 4A and 4B are otherwise similar, if not identical, to the computing systems 105*a*, 105*b*, 105, and 305 of FIGS. 1-3, the fixed (broadband) network nodes 130*a*-130*n*, 130, 330, 335, and 360 of FIGS. 1-3, and the wireless network nodes 135, 140*a*-140*n*, 145*a*-145*n*, 150, 340*a*-340*n*, 345*a*-345*n*, 350*a*-350*n*, and 355 of FIGS. 1-3, and the descriptions of these components of system 100, 200, or 300 are applicable to the corresponding components of system 400 or 400', respectively.

FIGS. 5A-5F (collectively, "FIG. 5") are flow diagrams illustrating a method 500 for implementing combined broadband and wireless SON, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, and 400 of FIGS. 1, 2, 3, and 4, respectively (or components thereof), such methods may also be implemented using any suitable hardware (or software) implementation. Similarly, while each of the systems 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems 100, 200, 300, and 400 of FIGS. 1, 2, 3, and 4 can each also operate according to other modes of operation and/or perform other suitable procedures.

Figure 5A:
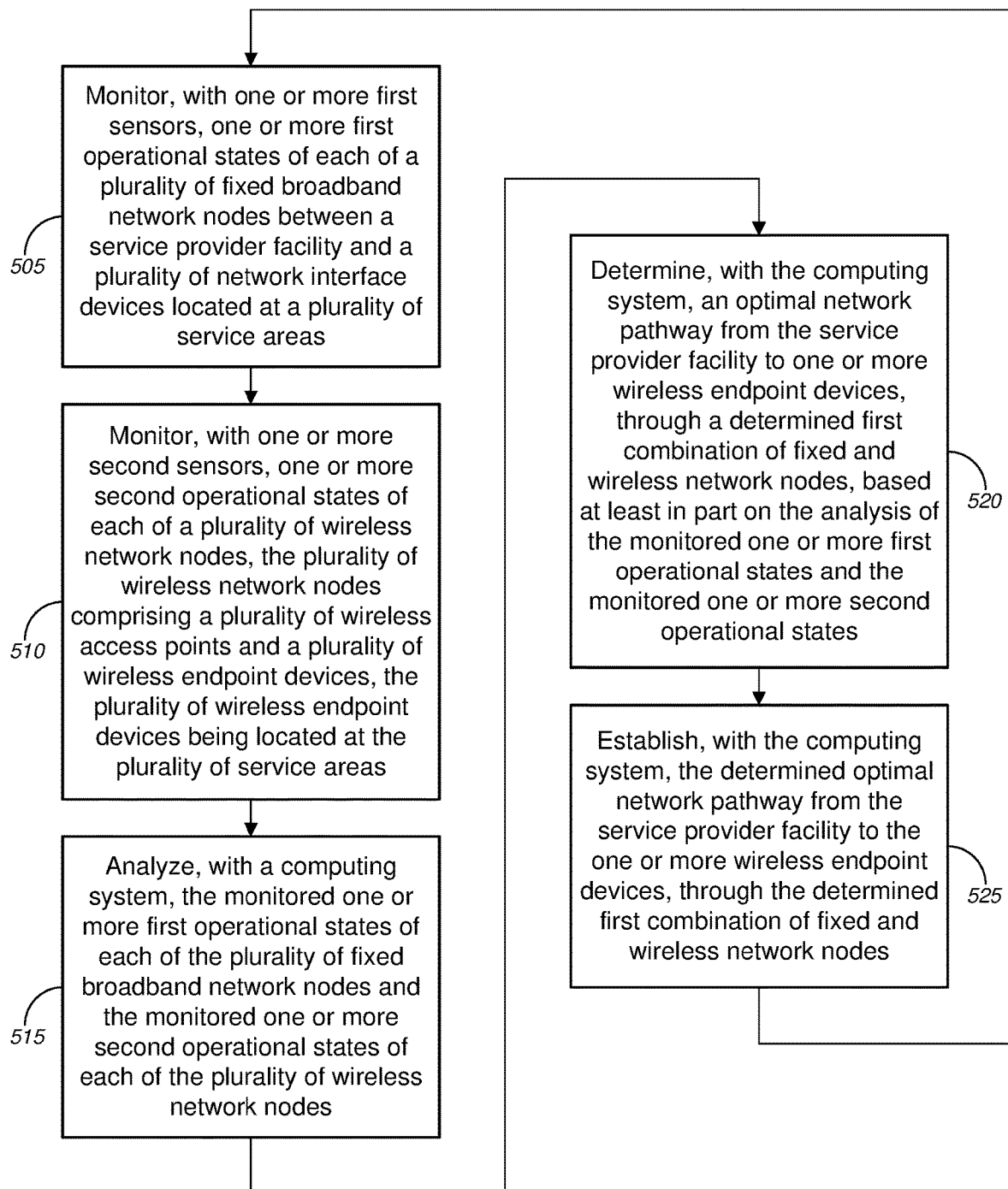

In the non-limiting embodiment of FIG. 5A, method 500 might comprise monitoring, with one or more first sensors, one or more first operational states of each of a plurality of fixed broadband network nodes between a service provider facility and a plurality of network interface devices located at a plurality of service areas (block 505) and monitoring, with one or more second sensors, one or more second operational states of each of a plurality of wireless network nodes (block 510). The plurality of wireless network nodes might comprise a plurality of wireless access points and a plurality of wireless endpoint devices, the plurality of wireless endpoint devices being located at the plurality of service areas.

In some cases, monitoring the one or more first operational states might comprise obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. In some embodiments, monitoring the one or more second operational states comprises obtaining information comprising at least one of power levels, channel width, channel number, frequency of use of each channel, antenna elements (e.g., for beam forming or the like), modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

According to some embodiments, the plurality of fixed broadband network nodes might be associated with fixed broadband services comprising at least one of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, a frequency division vectoring service, a microwave radio service, a millimeter-wave radio service, a free-space optical service, a data over cable service interface specification ("DOCSIS")-based cable service, or a fixed backhaul wireless service, and/or the like. In some cases, the fixed backhaul wireless service might include, but is not limited to, point-to-point or point-to-multipoint microwave or millimeter-wave lines. These fixed backhaul wireless links, in some instances, might include their own subset of self-organizing rules to optimize backhaul services. In some embodiments, the plurality of wireless network nodes might be associated with wireless communications comprising at least one of machine-to-machine Internet of Things ("IoT") communications, Bluetooth communications, Z-wave communications, ZigBee communications, WiFi communications, cellular network communications, and/or the like.

Method 500 might further comprise, at block 515, analyzing, with a computing system, the monitored one or more first operational states of each of the plurality of fixed broadband network nodes and the monitored one or more second operational states of each of the plurality of wireless network nodes. According to some embodiments, the computing system might comprise one of a server computer located at the service provider facility, a distributed computing system, at least one of the plurality of fixed broadband network nodes, or at least one of the plurality of wireless network nodes, and/or the like. In some cases, at least one fixed broadband network node of the plurality of fixed broadband network nodes might comprise at least one first sensor of the one or more first sensors. The at least one first sensor might monitor the one or more first operational states of each of one or more adjacent fixed broadband network nodes of the plurality of fixed broadband network nodes. In embodiments where fixed broadband network nodes are linked by fixed wireless links, such links may be affected by weather impediments such as rain fades or the like. A combination of the use of rain sensors and attenuation measurements might be used to monitor operational states, and the computing system 105 might, based on the monitoring of operational states, optionally change paths within the fixed broadband network nodes and/or the fixed wireless network nodes, or the like. In embodiments where the fixed broadband network nodes are linked by a mix of fixed wireless links and wired links, monitoring weather impediments and rain fades might result in prioritizing links towards wired links during weather-affected time periods. At least one wireless network node of the plurality of wireless network nodes, in some cases, might comprise at least one second sensor of the one or more second sensors. The at least one second sensor might monitor the one or more second operational states of each of one or more adjacent wireless network nodes of the plurality of wireless network nodes.

At block 520, method 500 might comprise determining, with the computing system, an optimal network pathway from the service provider facility to one or more wireless endpoint devices, through a determined first combination of fixed and wireless network nodes, based at least in part on the analysis of the monitored one or more first operational states and the monitored one or more second operational states. The determined first combination of fixed and wireless network nodes might comprise one or more fixed broadband network nodes of the plurality of fixed broadband network nodes and one or more wireless network nodes of the plurality of wireless network nodes. Merely by way of example, in some cases, determining the optimal network pathway might comprise determining, with the computing system, the optimal network pathway to optimize at least one of coverage, capacity, latency, load balancing, privilege of a given area, mobility robustness, or key performance characteristics of the combination of fixed and wireless network nodes, and/or the like.

Method 500 might further comprise, at block 525, establishing, with the computing system, the determined optimal network pathway from the service provider facility to the one or more wireless endpoint devices, through the determined first combination of fixed and wireless network nodes. In some embodiments, multiple network services may be offered over the network, in which case each set of services may use a different determination method and/or parameters to determine the optimal network pathway(s). In other words, determining and establishing the optimal network pathway from the service provider facility to the one or more wireless endpoint devices, through the determined first combination of fixed and wireless network nodes are performed differently for different types of network services provided. For instance, video delivery services may optimize network pathways to minimize bit error rate, while other services such as voice services may optimize network pathways to minimize latency, and best effort data services offered at the same time over the same network might optimize network pathways in terms of maximizing throughput or other key parameters, including, without limitation, redundancy considerations, traffic statistics, peak bitrates, guaranteed bitrates, average bitrates, and/or the like.

According to some embodiments, method 500 might further comprise repeating the processes of: monitoring the one or more first operational states of each of the plurality of fixed broadband network nodes (at block 505); monitoring the one or more second operational states of each of the plurality of wireless network nodes (at block 510); and analyzing the monitored one or more first operations states of each of the plurality of fixed broadband network nodes and the monitored one or more second operational states of each of the plurality of wireless network nodes (at block 515). Method 500 might further comprise determining, with the computing system, a second optimal network pathway from the service provider facility to one or more wireless endpoint devices, through a determined third combination of fixed and wireless network nodes, based on the repeated analysis of the monitored one or more first operational states and the monitored one or more second operational states. Method 500 might also comprise determining, with the computing system, whether the optimal network pathway and the second optimal network pathway are different, and, based on a determination that the optimal network pathway and the second optimal network pathway are different, establishing, with the computing system, the determined second optimal network pathway from the service provider facility to the one or more wireless endpoint devices, through the determined third combination of fixed and wireless network nodes.

According to various embodiments, determining the optimal network pathway might comprise determining, with the computing system, one or more parameters to adjust in each of one or more of at least one fixed broadband network node of the plurality of fixed broadband network node or at least one wireless network node of the plurality of wireless network node to optimize at least one of coverage, capacity, latency, load balancing, privilege of a given area, mobility robustness, or key performance characteristics of the combination of fixed and wireless network nodes. Establishing the determined optimal network pathway might thus comprise adjusting, with the computing system, the determined one or more parameters in each of one or more of the at least one fixed broadband network node or the at least one wireless network node. Merely by way of example, in some cases, the one or more parameters might include, without limitation, at least one of bandwidth, train rate, tone being used, power levels, channel width, channel number, frequency of use, antenna element parameters (e.g., for beam forming or the like), modulation coding scheme, signal preconditioning parameters, or cyclic prefix (i.e., regular or extended), and/or the like. The modulation coding scheme might include, but is not limited to, at least one of modulation level, forward error correction ("FEC") type, or multiple-input multiple-output ("MIMO") rank, and/or the like. In other words, determining and establishing the optimal network pathway might either involve re-routing the network path through the combination of fixed and wireless network nodes and/or adjusting one or more parameters of the (existing or re-routed) fixed and/or wireless network nodes, or the like.

Figure 5B:
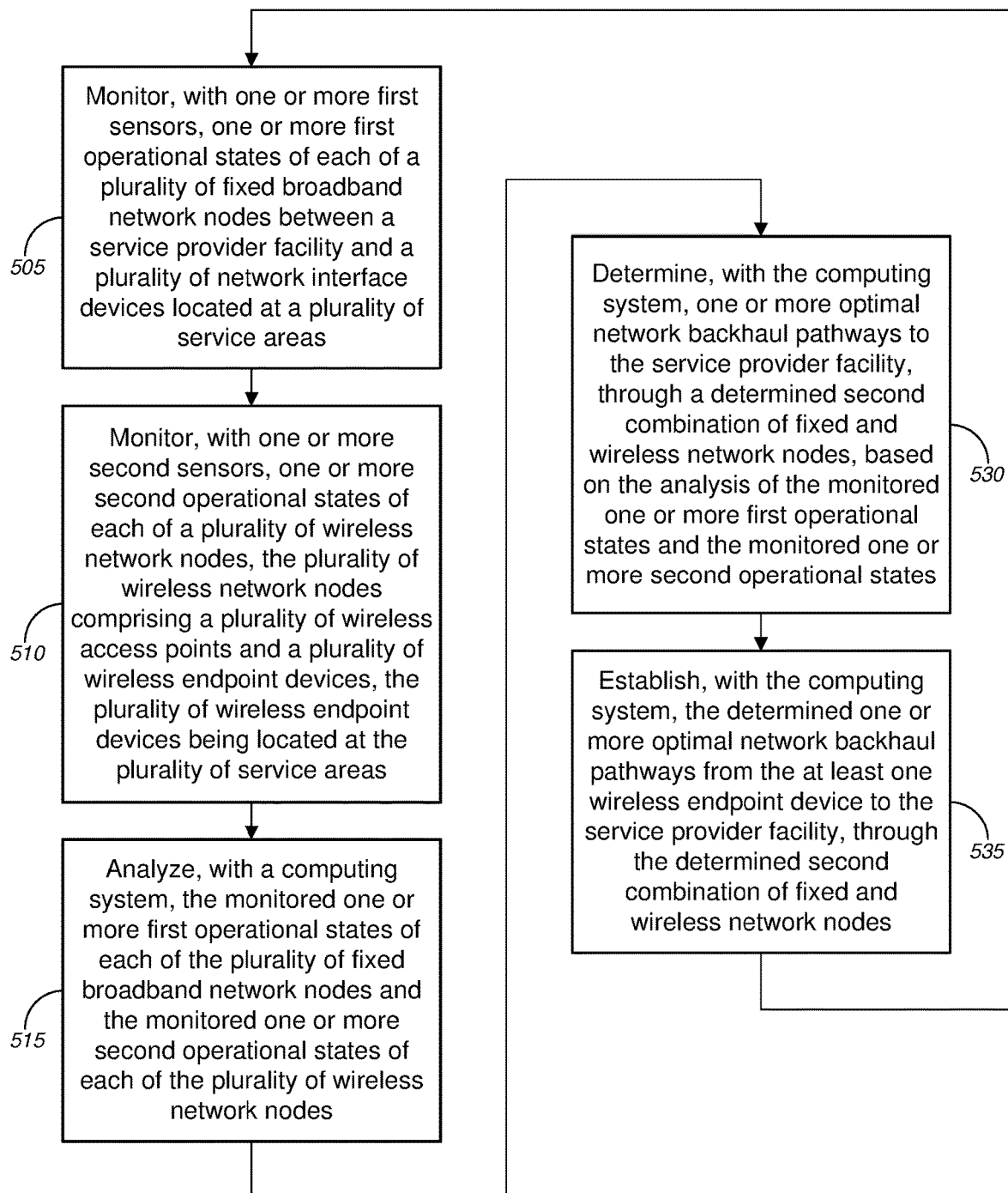

With reference to FIG. 5B, method 500 might comprise monitoring, with one or more first sensors, one or more first operational states of each of a plurality of fixed broadband network nodes between a service provider facility and a plurality of network interface devices located at a plurality of service areas (block 505) and monitoring, with one or more second sensors, one or more second operational states of each of a plurality of wireless network nodes (block 510). The plurality of wireless network nodes might comprise a plurality of wireless access points and a plurality of wireless endpoint devices, the plurality of wireless endpoint devices being located at the plurality of service areas.

In some cases, monitoring the one or more first operational states might comprise obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information, and/or the like. In some embodiments, monitoring the one or more second operational states comprises obtaining information comprising at least one of power levels, channel width, channel number, frequency of use of each channel, antenna elements (e.g., for beam forming or the like), modulation coding scheme information, signal preconditioning, or cyclic prefix (i.e., regular or extended), wherein the modulation coding scheme information comprises at least one of modulation level, forward error correction ("FEC") type, or multiple-input multiple-output ("MIMO") rank, and/or the like.

According to some embodiments, the plurality of fixed broadband network nodes might be associated with fixed broadband services comprising at least one of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, a frequency division vectoring service, a microwave radio service, a millimeter-wave radio service, a free-space optical service, a data over cable service interface specification ("DOCSIS")-based cable service, or a fixed backhaul wireless service, and/or the like. In some cases, the fixed backhaul wireless service might include, but is not limited to, point-to-point or point-to-multipoint microwave or millimeter-wave lines. These fixed backhaul wireless links, in some instances, might include their own subset of self-organizing rules to optimize backhaul services. In some embodiments, the plurality of wireless network nodes might be associated with wireless communications comprising at least one of machine-to-machine Internet of Things ("IoT") communications, Bluetooth communications, Z-wave communications, ZigBee communications, WiFi communications, cellular network communications, and/or the like.

Method 500 might further comprise, at block 515, analyzing, with a computing system, the monitored one or more first operational states of each of the plurality of fixed broadband network nodes and the monitored one or more second operational states of each of the plurality of wireless network nodes. According to some embodiments, the computing system might comprise one of a server computer located at the service provider facility, a distributed computing system, at least one of the plurality of fixed broadband network nodes, or at least one of the plurality of wireless network nodes, and/or the like. In some cases, at least one fixed broadband network node of the plurality of fixed broadband network nodes might comprise at least one first sensor of the one or more first sensors. The at least one first sensor might monitor the one or more first operational states of each of one or more adjacent fixed broadband network nodes of the plurality of fixed broadband network nodes. At least one wireless network node of the plurality of wireless network nodes, in some cases, might comprise at least one second sensor of the one or more second sensors. The at least one second sensor might monitor the one or more second operational states of each of one or more adjacent wireless network nodes of the plurality of wireless network nodes.

At block 530, method 500 might comprise determining, with the computing system, one or more optimal network backhaul pathways to the service provider facility, through a determined second combination of fixed and wireless network nodes, based on the analysis of the monitored one or more first operational states and the monitored one or more second operational states. The determined second combination of fixed and wireless network nodes might comprise at least one fixed broadband network node of the plurality of fixed broadband network nodes and at least one wireless network node of the plurality of wireless network nodes.

Method 500 might further comprise, at block 535, establishing, with the computing system, the determined one or more optimal network backhaul pathways (e.g., from the at least one wireless endpoint device or other wireless network nodes) to the service provider facility, through the determined second combination of fixed and wireless network nodes.

According to some embodiments, method 500 might further comprise repeating the processes of: monitoring the one or more first operational states of each of the plurality of fixed broadband network nodes (at block 505); monitoring the one or more second operational states of each of the plurality of wireless network nodes (at block 510); and analyzing the monitored one or more first operations states of each of the plurality of fixed broadband network nodes and the monitored one or more second operational states of each of the plurality of wireless network nodes (at block 515). Method 500 might further comprise determining, with the computing system, a second optimal network backhaul pathway to the service provider facility, through a determined fourth combination of fixed and wireless network nodes, based on the repeated analysis of the monitored one or more first operational states and the monitored one or more second operational states. Method 500 might also comprise determining, with the computing system, whether the optimal network backhaul pathway and the second optimal network backhaul pathway are different, and, based on a determination that the optimal network backhaul pathway and the second optimal network backhaul pathway are different, establishing, with the computing system, the determined second optimal network backhaul pathway to the service provider facility, through the determined fourth combination of fixed and wireless network nodes.

According to various embodiments, determining the optimal network backhaul pathway might comprise determining, with the computing system, one or more parameters to adjust in each of one or more of at least one fixed broadband network node of the plurality of fixed broadband network node or at least one wireless network node of the plurality of wireless network nodes to optimize backhaul service. Establishing the determined optimal network backhaul pathway might thus comprise adjusting, with the computing system, the determined one or more parameters in each of one or more of the at least one fixed broadband network node or the at least one wireless network node. Merely by way of example, in some cases, the one or more parameters might include, without limitation, at least one of bandwidth, train rate, tone being used, power levels, channel width, channel number, frequency of use, antenna element parameters (e.g., for beam forming or the like), modulation coding scheme, signal preconditioning parameters, or cyclic prefix (i.e., regular or extended), and/or the like. The modulation coding scheme might include, but is not limited to, at least one of modulation level, forward error correction ("FEC") type, or multiple-input multiple-output ("MIMO") rank, and/or the like. In other words, determining and establishing the optimal network backhaul pathway might either involve re-routing the network backhaul path through the combination of fixed and wireless network nodes and/or adjusting one or more parameters of the (existing or re-routed) fixed and/or wireless network nodes, or the like.

Turning to FIG. 5C, merely by way of example, in some embodiments, establishing the determined optimal network pathway from the service provider facility to the one or more wireless endpoint devices, through the determined first combination of fixed and wireless network nodes (at block 525), might comprise sending, with the computing system, instructions to one or more intermediary network switches to direct broadband traffic along the determined optimal network pathway from the service provider facility to the one or more wireless endpoint devices to provide broadband service to the one or more wireless endpoint devices (block 540).

Referring to FIG. 5D, according to some embodiments, establishing the determined one or more optimal network backhaul pathways (from the at least one wireless endpoint device or other wireless network nodes) to the service provider facility (at block 535) might comprise sending, with the computing system, instructions to intermediary network switches to direct backhaul traffic along the determined one or more optimal network backhaul pathways from the at least one wireless endpoint device to the service provider facility to provide backhaul service (block 545).

With respect to FIG. 5E, in some cases, according to some embodiments, the monitored one or more first operational states and the monitored one or more second operational states might each comprise bandwidth usage and bandwidth capacity, and determining the one or more optimal network backhaul pathways (at block 530) might comprise determining, with the computing system, the one or more optimal network backhaul pathways based on available bandwidth exceeding subscribed-to bandwidth for each of a plurality of customers (block 550).

With reference to FIG. 5F, in some embodiments, determining the optimal network pathway (at block 520) and determining the one or more optimal network backhaul pathways (at block 530) are initiated in response to each of one or more trigger events (block 555). Merely by way of example, according to some embodiments, the one or more trigger events might each comprise one of a sudden statistically significant change in network performance characteristics, a change in network performance characteristics that exceed predetermined threshold levels, a seasonal change in wireless propagation characteristics, a weather-related change in wireless propagation characteristics, a network service fault at one or more fixed broadband network nodes of the plurality of fixed broadband network nodes, a network service fault at one or more wireless network nodes of the plurality of wireless network nodes, a completed sales transaction with a customer for provisioning of network services to the customer, or a change in network usage that exceeds specified levels, and/or the like.

Exemplary System and Hardware Implementation

Figure 6:
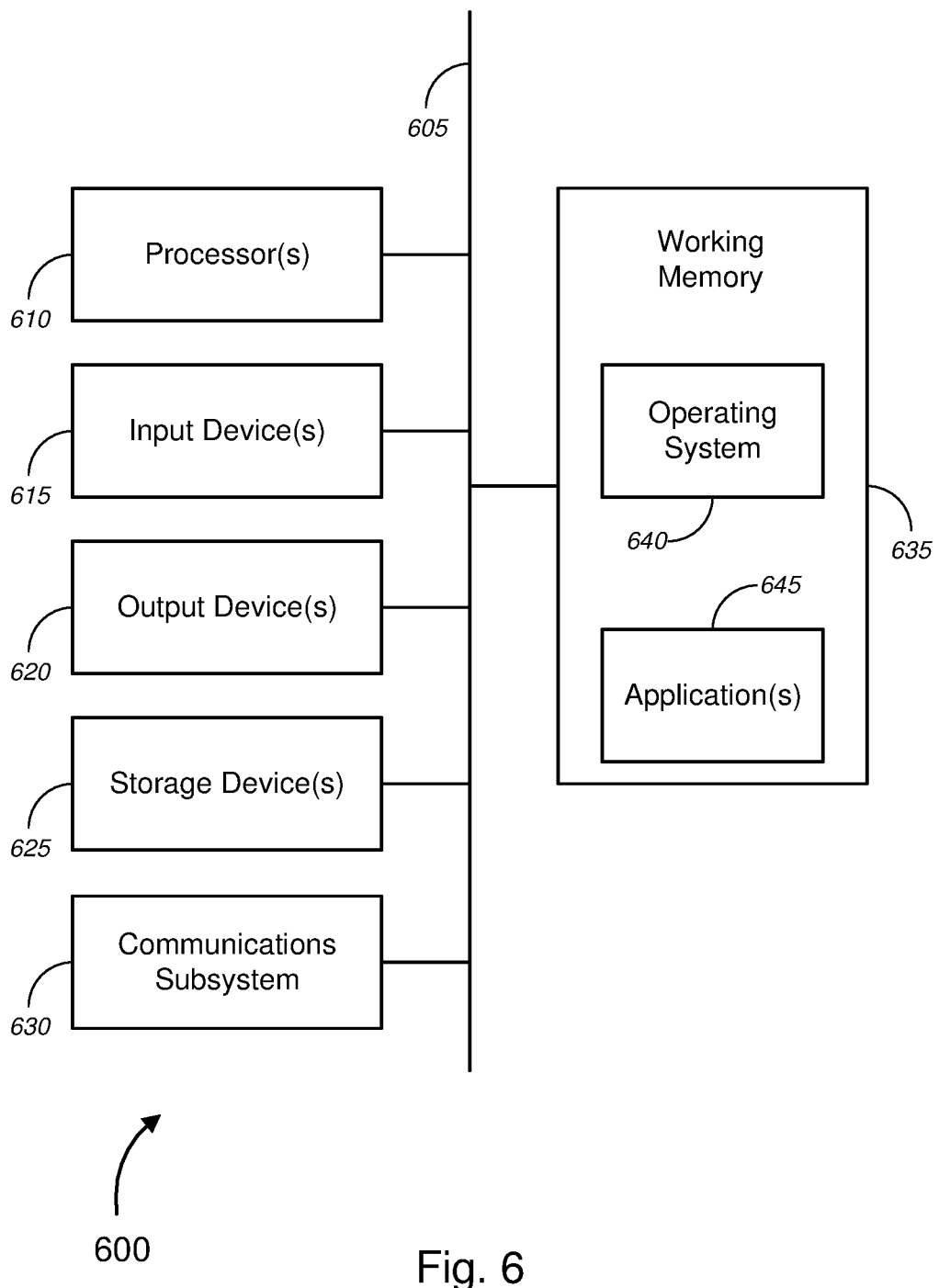
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing systems 105a, 105b, 105, 305, and 405, fixed (broadband) network nodes 130a-130n, 130, 330, 335, 360, and 430a-430c, wireless network nodes 135, 140a-140n, 145a-145n, 150, 340a-340n, 345a-345n, 350a-350n, 355, and 450d-450g, servers 305-325 and 360, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing systems 105a, 105b, 105, 305, and 405, fixed (broadband) network nodes 130a-130n, 130, 330, 335, 360, and 430a-430c, wireless network nodes 135, 140a-140n, 145a-145n, 150, 340a-340n, 345a-345n, 350a-350n, 355, and 450d-450g, servers 305-325 and 360, etc), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, sensors, and/or the like; and one or more output devices 620, which can include, without limitation, a display device, a printer, indicator lights, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
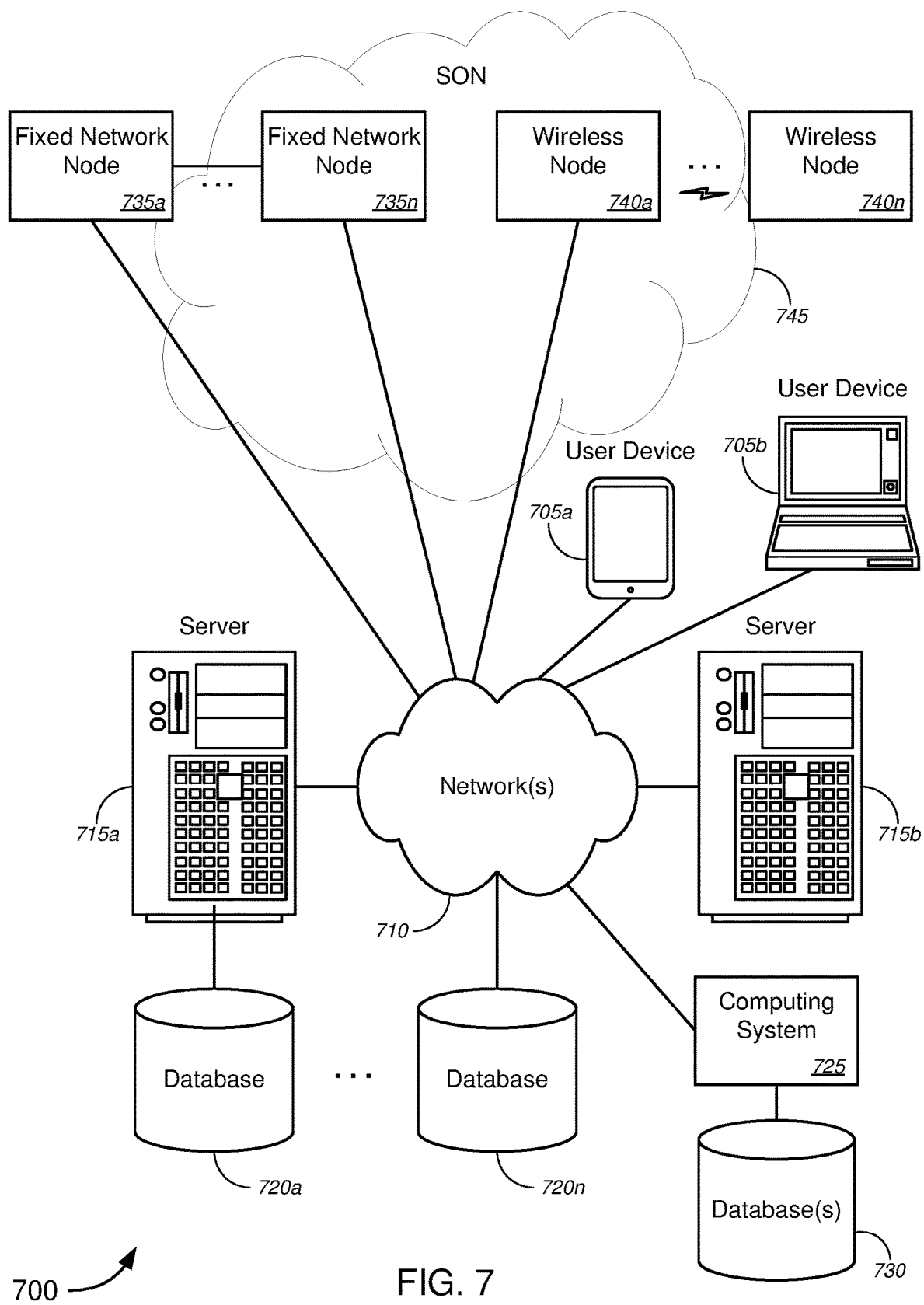
FIG. 7 is a block diagram illustrating a networked system of computers, computing systems, or system hardware architecture, which can be used in accordance with various embodiments.

As noted above, a set of embodiments comprises methods and systems for implementing network infrastructure for provisioning of services, and, in particular embodiments, to methods, systems, apparatus, and computer software for implementing combined broadband and wireless self-organizing network ("SON") for provisioning of services. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, smart phone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to networks 120 and 125 of FIG. 1 or network 120 of FIG. 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a cellular network, an LTE network, a network operating under any of the IEEE 802.11 suite of protocols, the 802.16 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing network infrastructure for provisioning of services, and, in particular embodiments, to methods, systems, apparatus, and computer software for implementing combined broadband and wireless self-organizing network ("SON") for provisioning of services, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a computing system 725 (which might correspond to computing systems 105a, 105b, 105, 305, and 405 of FIGS. 1-4, or the like) and corresponding database(s) 730 (which might correspond to databases 110a, 110b, and 110 of FIGS. 1 and 2, or the like). System 700 might further comprise one or more fixed (broadband) network nodes 735a-735n (collectively, "fixed network nodes 735") and one or more wireless network nodes 740a-740n (collectively, "wireless network nodes 740"). The fixed network nodes 735 and the wireless network nodes 740 (which, in some cases, might include one or more of the user devices 705a and/or 705b, or the like) might be implemented as a combined fixed broadband and wireless self-organizing network ("SON") 745, as described herein.

In operation, the computing system 725 (which might be embodied as one or more of servers 715a or 715b, or as one or more of the fixed network nodes 735, or as one or more of the wireless network nodes 740, or as a separate component as shown in FIG. 7, or the like) might receive, from one or more first sensors, information regarding one or more first operational states of each of a plurality of fixed broadband network nodes between a service provider facility and a plurality of network interface devices located at a plurality of service areas; receive, from one or more second sensors, information regarding one or more second operational states of each of a plurality of wireless network nodes, the plurality of wireless network nodes comprising a plurality of wireless access points and a plurality of wireless endpoint devices, the plurality of wireless endpoint devices being located at the plurality of service areas; and analyze the received information regarding the one or more first operational states of each of the plurality of fixed broadband network nodes and the received information regarding the one or more second operational states of each of the plurality of wireless network nodes. The computing system 725 might determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states, the determined first combination of fixed and wireless network nodes comprising one or more fixed broadband network nodes of the plurality of fixed broadband network nodes and one or more wireless network nodes of the plurality of wireless network nodes; and might establish the determined optimal network pathway from the service provider facility to the one or more wireless endpoint devices, through the determined first combination of fixed and wireless network nodes.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    monitoring, with one or more first sensors, one or more first operational states of each of a plurality of fixed broadband network nodes between a service provider facility and a plurality of network interface devices located at a plurality of service areas;
    monitoring, with one or more second sensors, one or more second operational states of each of a plurality of wireless network nodes, the plurality of wireless network nodes comprising a plurality of wireless access points and a plurality of wireless endpoint devices, the plurality of wireless endpoint devices being located at the plurality of service areas;
    analyzing, with a computing system, the monitored one or more first operational states of each of the plurality of fixed broadband network nodes and the monitored one or more second operational states of each of the plurality of wireless network nodes;
    determining, with the computing system, an optimal network pathway from the service provider facility to one or more wireless endpoint devices, through a determined first combination of fixed and wireless network nodes, based at least in part on the analysis of the monitored one or more first operational states and the monitored one or more second operational states, the determined first combination of fixed and wireless network nodes comprising one or more fixed broadband network nodes of the plurality of fixed broadband network nodes and one or more wireless network nodes of the plurality of wireless network nodes;
    establishing, with the computing system, the determined optimal network pathway from the service provider facility to the one or more wireless endpoint devices, through the determined first combination of fixed and wireless network nodes;
    repeating the processes of:
        monitoring the one or more first operational states of each of the plurality of fixed broadband network nodes;
        monitoring the one or more second operational states of each of the plurality of wireless network nodes; and
        analyzing the monitored one or more first operations states of each of the plurality of fixed broadband network nodes and the monitored one or more second operational states of each of the plurality of wireless network nodes;
    determining, with the computing system, a second optimal network pathway from the service provider facility to one or more wireless endpoint devices, through a determined third combination of fixed and wireless network nodes, based on the repeated analysis of the monitored one or more first operational states and the monitored one or more second operational states;
    determining, with the computing system, whether the optimal network pathway and the second optimal network pathway are different; and
    based on a determination that the optimal network pathway and the second optimal network pathway are different, establishing, with the computing system, the determined second optimal network pathway from the service provider facility to the one or more wireless endpoint devices, through the determined third combination of fixed and wireless network nodes.

2. The method of claim 1, wherein establishing the determined optimal network pathway from the service provider facility to the one or more wireless endpoint devices, through the determined first combination of fixed and wireless network nodes, comprises sending, with the computing system, instructions to one or more intermediary network switches to direct broadband traffic along the determined optimal network pathway from the service provider facility to the one or more wireless endpoint devices to provide broadband service to the one or more wireless endpoint devices.

3. The method of claim 1, wherein determining and establishing the optimal network pathway from the service provider facility to the one or more wireless endpoint devices, through the determined first combination of fixed and wireless network nodes are performed differently for different types of network services provided.

4. The method of claim 1, further comprising:
    determining, with the computing system, one or more optimal network backhaul pathways to the service provider facility, through a determined second combination of fixed and wireless network nodes, based on the analysis of the monitored one or more first operational states and the monitored one or more second operational states, the determined second combination of fixed and wireless network nodes comprising at least one fixed broadband network node of the plurality of fixed broadband network nodes and at least one wireless network node of the plurality of wireless network nodes; and establishing, with the computing system, the determined one or more optimal network backhaul pathways from the at least one wireless endpoint device to the service provider facility, through the determined second combination of fixed and wireless network nodes.

5. The method of claim 4, wherein the monitored one or more first operational states and the monitored one or more second operational states each comprises bandwidth usage and bandwidth capacity, wherein determining the one or more optimal network backhaul pathways comprises determining, with the computing system, the one or more optimal network backhaul pathways based on available bandwidth exceeding subscribed-to bandwidth for each of a plurality of customers.

6. The method of claim 4, wherein establishing the determined one or more optimal network backhaul pathways from the at least one wireless endpoint device to the service provider facility comprises sending, with the computing system, instructions to intermediary network switches to direct backhaul traffic along the determined one or more optimal network backhaul pathways from the at least one wireless endpoint device to the service provider facility to provide backhaul service.

7. The method of claim 4, wherein determining the optimal network pathway and determining the one or more optimal network backhaul pathways are initiated in response to each of one or more trigger events.

8. The method of claim 7, wherein the one or more trigger events each comprises one of a sudden statistically significant change in network performance characteristics, a change in network performance characteristics that exceed predetermined threshold levels, a seasonal change in wireless propagation characteristics, a weather-related change in wireless propagation characteristics, a network service fault at one or more fixed broadband network nodes of the plurality of fixed broadband network nodes, a network service fault at one or more wireless network nodes of the plurality of wireless network nodes, a completed sales transaction with a customer for provisioning of network services to the customer, or a change in network usage that exceeds specified levels.

9. The method of claim 1, wherein the plurality of fixed broadband network nodes are associated with fixed broadband services comprising at least one of a passive optical network ("PON") service, a gigabit PON ("GPON") service, an Ethernet fiber line service, an Ethernet PON ("EPON") service, a next generation PON ("NGPON") service, a second generation NGPON or 40 Gigabit-capable PON ("NGPON2") service, a digital subscriber line ("DSL") service, an asymmetric DSL ("ADSL") service, a symmetric DSL ("SDSL") service, a high speed voice and data link service, a rate-adaptive DSL ("RADSL") service, a very high bit rate DSL ("VDSL," "VDSL2," or "VDSL2-Vplus"), a uni-DSL ("UDSL") service, a frequency division vectoring service, a microwave radio service, a millimeter-wave radio service, a free-space optical service, a data over cable service interface specification ("DOCSIS")-based cable service, or a fixed backhaul wireless service.

10. The method of claim 1, wherein the plurality of wireless network nodes are associated with wireless communications comprising at least one of machine-to-machine Internet of Things ("IoT") communications, Bluetooth communications, Z-wave communications, ZigBee communications, WiFi communications, or cellular network communications.

11. The method of claim 1, wherein at least one fixed broadband network node of the plurality of fixed broadband network nodes comprises at least one first sensor of the one or more first sensors, wherein the at least one first sensor monitors the one or more first operational states of each of one or more adjacent fixed broadband network nodes of the plurality of fixed broadband network nodes, wherein at least one wireless network node of the plurality of wireless network nodes comprises at least one second sensor of the one or more second sensors, wherein the at least one second sensor monitors the one or more second operational states of each of one or more adjacent wireless network nodes of the plurality of wireless network nodes.

12. The method of claim 1, wherein monitoring the one or more first operational states comprises obtaining information comprising at least one of available bandwidth, number of operational splitters, location information, type of fixed broadband network, loop qualification information, loop length, port speed audit information, train rate information, digital subscriber line ("DSL") vectoring rate information, maximum available bit rates, current synchronization rates, tone utilization information, line code violation information, or upstream and downstream forward error correction ("FEC") information.

13. The method of claim 1, wherein monitoring the one or more second operational states comprises obtaining information comprising at least one of power levels, channel width, channel number, frequency of use of each channel, antenna elements, modulation coding scheme information, signal preconditioning, or cyclic prefix, wherein the modulation coding scheme information comprises at least one of modulation level, forward error correction ("FEC") type, or multiple-input multiple-output ("MIMO") rank.

14. The method of claim 1, wherein determining the optimal network pathway comprises determining, with the computing system, the optimal network pathway to optimize at least one of coverage, capacity, latency, load balancing, privilege of a given area, mobility robustness, or key performance characteristics of the combination of fixed and wireless network nodes.

15. The method of claim 1, wherein determining the optimal network pathway comprises determining, with the computing system, one or more parameters to adjust in each of one or more of at least one fixed broadband network node of the plurality of fixed broadband network node or at least one wireless network node of the plurality of wireless network node to optimize at least one of coverage, capacity, latency, load balancing, privilege of a given area, mobility robustness, or key performance characteristics of the combination of fixed and wireless network nodes, and wherein establishing the determined optimal network pathway comprises adjusting, with the computing system, the determined one or more parameters in each of one or more of the at least one fixed broadband network node or the at least one wireless network node.

16. The method of claim 15, wherein the one or more parameters comprise at least one of bandwidth, train rate, tone being used, power levels, channel width, channel number, frequency of use, antenna element parameters, modulation coding scheme, signal preconditioning parameters, or cyclic prefix, wherein the modulation coding scheme includes at least one of modulation level, forward error correction ("FEC") type, or multiple-input multiple-output ("MIMO") rank.

17. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, from one or more first sensors, information regarding one or more first operational states of each of a plurality of fixed broadband network nodes between a service provider facility and a plurality of network interface devices located at a plurality of service areas;

receive, from one or more second sensors, information regarding one or more second operational states of each of a plurality of wireless network nodes, the plurality of wireless network nodes comprising a plurality of wireless access points and a plurality of wireless endpoint devices, the plurality of wireless endpoint devices being located at the plurality of service areas;

analyze the received information regarding the one or more first operational states of each of the plurality of fixed broadband network nodes and the received information regarding the one or more second operational states of each of the plurality of wireless network nodes;

determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states, the determined first combination of fixed and wireless network nodes comprising one or more fixed broadband network nodes of the plurality of fixed broadband network nodes and one or more wireless network nodes of the plurality of wireless network nodes;

establish the determined optimal network pathway from the service provider facility to the one or more wireless endpoint devices, through the determined first combination of fixed and wireless network node repeat the processes of:

monitoring the one or more first operational states of each of the plurality of fixed broadband network nodes;

monitoring the one or more second operational states of each of the plurality of wireless network nodes; and analyzing the monitored one or more first operations states of each of the plurality of fixed broadband network nodes and the monitored one or more second operational states of each of the plurality of wireless network nodes;

determine a second optimal network pathway from the service provider facility to one or more wireless endpoint devices, through a determined third combination of fixed and wireless network nodes, based on the repeated analysis of the monitored one or more first operational states and the monitored one or more second operational states;

determine whether the optimal network pathway and the second optimal network pathway are different; and based on a determination that the optimal network pathway and the second optimal network pathway are different, establish the determined second optimal network pathway from the service provider facility to the one or more wireless endpoint devices, through the determined third combination of fixed and wireless network nodes.

18. The apparatus of claim 17, wherein the apparatus comprises one of a server computer located at the service provider facility, a distributed computing system, at least one of the plurality of fixed broadband network nodes, or at least one of the plurality of wireless network nodes.

19. A system, comprising:

one or more first sensors that monitor one or more first operational states of each of a plurality of fixed broadband network nodes between a service provider facility and a plurality of network interface devices located at a plurality of service areas;

one or more second sensors that monitor one or more second operational states of each of a plurality of wireless network nodes, the plurality of wireless network nodes comprising a plurality of wireless access points and a plurality of wireless endpoint devices, the plurality of wireless endpoint devices being located at the plurality of service areas; and a computing system, comprising:

at least one processor; and a non-transitory computer readable medium communicatively coupled to the at least one processor, the non-transitory computer readable medium having stored thereon computer software comprising a set of instructions that, when executed by the at least one processor, causes the computing system to:

receive, from the one or more first sensors, information regarding one or more first operational states of each of the plurality of fixed broadband network nodes between the service provider facility and the plurality of network interface devices located at the plurality of service areas;

receive, from the one or more second sensors, information regarding one or more second operational states of each of the plurality of wireless network nodes;

analyze the received information regarding the one or more first operational states of each of the plurality of fixed broadband network nodes and the received information regarding the one or more second operational states of each of the plurality of wireless network nodes;

determine an optimal network pathway from the service provider facility to one or more wireless endpoint devices, through a determined first combination of fixed and wireless network nodes, based at least in part on the analysis of the received information regarding the one or more first operational states and the received information regarding the one or more second operational states, the determined first combination of fixed and wireless network nodes comprising one or more fixed broadband network nodes of the plurality of fixed broadband network nodes and one or more wireless network nodes of the plurality of wireless network nodes;

establish the determined optimal network pathway from the service provider facility to the one or more wireless endpoint devices, through the determined first combination of fixed and wireless network nodes;
repeat the processes of:
   monitoring the one or more first operational states of each of the plurality of fixed broadband network nodes;
   monitoring the one or more second operational states of each of the plurality of wireless network nodes; and
   analyzing the monitored one or more first operations states of each of the plurality of fixed broadband network nodes and the monitored one or more second operational states of each of the plurality of wireless network nodes;
determine a second optimal network pathway from the service provider facility to one or more wireless endpoint devices, through a determined third combination of fixed and wireless network nodes, based on the repeated analysis of the monitored one or more first operational states and the monitored one or more second operational states;
determine whether the optimal network pathway and the second optimal network pathway are different; and
based on a determination that the optimal network pathway and the second optimal network pathway are different, establish the determined second optimal network pathway from the service provider facility to the one or more wireless endpoint devices, through the determined third combination of fixed and wireless network nodes.

\* \* \* \* \*